United States Patent
Dayal et al.

(10) Patent No.: US 9,608,689 B2
(45) Date of Patent: Mar. 28, 2017

(54) DYNAMIC TRIGGER ALGORITHM FOR ANTENNA SWITCH DIVERSITY

(71) Applicant: QUALCOMM Incorporated, San Diego, CA (US)

(72) Inventors: Abhinav Dayal, San Diego, CA (US); Manjinder Singh Sandhu, Poway, CA (US); Madhusudan Kinthada Venkata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/269,769

(22) Filed: May 5, 2014

(65) Prior Publication Data

US 2014/0341125 A1  Nov. 20, 2014

Related U.S. Application Data

(60) Provisional application No. 61/823,218, filed on May 14, 2013.

(51) Int. Cl.
*H04B 7/06* (2006.01)
*H04B 1/44* (2006.01)
*H04W 72/12* (2009.01)
*H04B 7/08* (2006.01)

(52) U.S. Cl.
CPC ............... *H04B 1/44* (2013.01); *H04B 7/082* (2013.01); *H04B 7/0814* (2013.01); *H04B 7/0831* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 7,697,623 B2 | 4/2010 | Mehta et al. | |
| 2005/0030927 A1* | 2/2005 | Mucke | H04L 5/023 370/336 |
| 2006/0176858 A1* | 8/2006 | Ishii | H04B 7/0634 370/334 |
| 2006/0194615 A1* | 8/2006 | Vallapureddy | A61N 1/37223 455/562.1 |
| 2009/0129304 A1* | 5/2009 | Kim | H04L 5/0007 370/311 |

(Continued)

FOREIGN PATENT DOCUMENTS

| CN | WO 2013013376 A1 * | 1/2013 | H04B 7/0404 |
|---|---|---|---|
| EP | 1150440 A1 | 10/2001 | |

(Continued)

OTHER PUBLICATIONS

ISA/EPO, International Search Report and Written Opinion of the International Searching Authority, Int'l App. No. PCT/US2014/037271, Aug. 26, 2014, European Patent Office, Rijswijk, NL 11 pgs.

*Primary Examiner* — Hassan Phillips
*Assistant Examiner* — Ayanah George
(74) *Attorney, Agent, or Firm* — Holland & Hart LLP

(57) ABSTRACT

Methods, systems, and devices are described for triggering an antenna switch. A settling time may be identified, and the antenna switch may be delayed based at least in part on the identified settling time. The settling time may include an estimated delay in reception attributable to settling following the antenna switch.

27 Claims, 15 Drawing Sheets

(56) References Cited

U.S. PATENT DOCUMENTS

| | | |
|---|---|---|
| 2010/0254326 A1 | 10/2010 | Sawahashi et al. |
| 2010/0297958 A1* | 11/2010 | Murakami ............... H04N 5/38 455/77 |
| 2010/0297959 A1* | 11/2010 | Newton ................. H04B 7/082 455/83 |
| 2012/0008510 A1 | 1/2012 | Cai et al. |
| 2012/0021702 A1* | 1/2012 | Liu ................... H04W 52/0251 455/90.2 |
| 2013/0028186 A1 | 1/2013 | Kim |
| 2014/0036797 A1 | 2/2014 | Palanivelu et al. |

FOREIGN PATENT DOCUMENTS

| | | |
|---|---|---|
| JP | 2006279815 A | 10/2006 |
| JP | 2011024038 A | 2/2011 |
| WO | WO 2013013376 A1 * | 1/2013 |
| WO | WO 2014/036154 A1 | 3/2014 |

* cited by examiner

DYNAMIC TRIGGER ALGORITHM FOR ANTENNA SWITCH DIVERSITY

CROSS REFERENCES

The present application for patent claims priority to U.S. Provisional Patent Application No. 61/823,218 by Dayal et al., entitled "Dynamic Trigger Algorithm for Antenna Switch Diversity," filed May 14, 2013, assigned to the assignee hereof, and expressly incorporated by reference herein.

BACKGROUND

Wireless communications systems are widely deployed to provide various communication services such as voice, video, packet data, messaging, broadcast, and the like. These wireless communications systems may be multiple-access networks capable of supporting multiple users by sharing the available network resources.

A wireless communications system may include a number of base stations or NodeBs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

The base station and the UE may each use multiple antennas when communicating with each other. In some cases, the UE may determine that the quality of its transmissions to the base station have deteriorated. The UE may determine this on its own, or after receiving feedback (or a lack of feedback—i.e., lack of acknowledgements) from the base station. Poor quality transmissions may result, for example, from a blocked antenna (e.g., as a result of a user having his or her thumb over an antenna) or over-the-air interference. To address this problem, the UE may initiate an antenna switch in which a transmit chain of the UE is switched to an alternate antenna. However, in some cases, the antenna switch for the transmit chain may necessitate an antenna switch for one or more of the UE's receive chains. Typically, an antenna switch for a receive chain will result in the loss of data. The data loss may be due, at least in part, to the settling time of the switching process.

SUMMARY

The described features generally relate to one or more improved methods, systems, and/or apparatuses for triggering an antenna switch in a manner that mitigates or avoids data loss.

A method for triggering an antenna switch is described. In some configurations, a settling time may be identified, and the antenna switch may be delayed based at least in part on the identified settling time. The settling time may include an estimated delay in reception attributable to settling following the antenna switch.

In some embodiments, the identified settling time may be less than a remaining time of a current sub-frame after decoding a Physical Downlink Control Channel (PDCCH) of the current sub-frame. In these embodiments, the method may include decoding the PDCCH to retrieve downlink control information (DCI), and determining whether a Physical Downlink Shared Channel (PDSCH) is scheduled in the current sub-frame based at least in part on the retrieved DCI. In some cases, upon determining that a PDSCH is scheduled in the current sub-frame, the antenna switch may be delayed until one or more sub-frames following the current sub-frame. In other cases, upon determining that a PDSCH is absent in the current sub-frame, an antenna may be switched during the current sub-frame.

In some embodiments, the identified settling time may be greater than a remaining time of a current sub-frame after decoding a PDCCH of the current sub-frame. In these embodiments, the method may include identifying a duration of the PDCCH of the current sub-frame, and switching an antenna following the identified duration of the PDCCH.

In further embodiments, the identified settling time may be greater than a remaining time of a current sub-frame after a duration of a PDCCH of the current sub-frame. In these embodiments, an antenna may be switched at a beginning of the current sub-frame.

In still other embodiments, the identified settling time may be greater than a duration of the current sub-frame. In these embodiments, the method may include decoding a PDCCH of the current sub-frame to retrieve DCI, and determining whether a PDSCH is scheduled in the current sub-frame based at least in part on the retrieved DCI. In some cases, upon determining that a PDSCH is scheduled in the current sub-frame, the antenna switch may be delayed until one or more sub-frames following the current sub-frame. In other cases, upon determining that a PDSCH is absent in the current sub-frame, an antenna may be switched during the current sub-frame.

In some configurations, the settling time may include a time for a hardware switch to settle.

In some configurations, the settling time may include a time for one or more receiver loops to settle on channel conditions following the antenna switch.

An apparatus for triggering an antenna switch is also described. In some configurations, the apparatus may include a processor, a memory in electronic communication with the processor, and instructions stored in the memory. The instructions may be executable by the processor to identify a settling time and delay the antenna switch based at least in part on the identified settling time. The settling time may include an estimated delay in reception attributable to settling following the antenna switch.

In some embodiments, the apparatus may further include at least one switch operably connected to the processor, at least one antenna operably connected to the at least one switch, at least one receive chain operably connected to the at least one switch, and at least one transmit chain operably connected to the at least one switch.

Another apparatus for triggering an antenna switch is described. In some configurations, the apparatus may include a means for identifying a settling time, and a means for delaying the antenna switch based at least in part on the identified settling time. The settling time may include an estimated delay in reception attributable to settling following the antenna switch.

A computer program product for triggering an antenna switch is also described. The computer program product may include a non-transitory computer-readable medium storing instructions executable by a processor. The instructions may be executable by the processor to identify a settling time and delay the antenna switch based at least in part on the identified settling time. The settling time may include an estimated delay in reception attributable to settling following the antenna switch.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
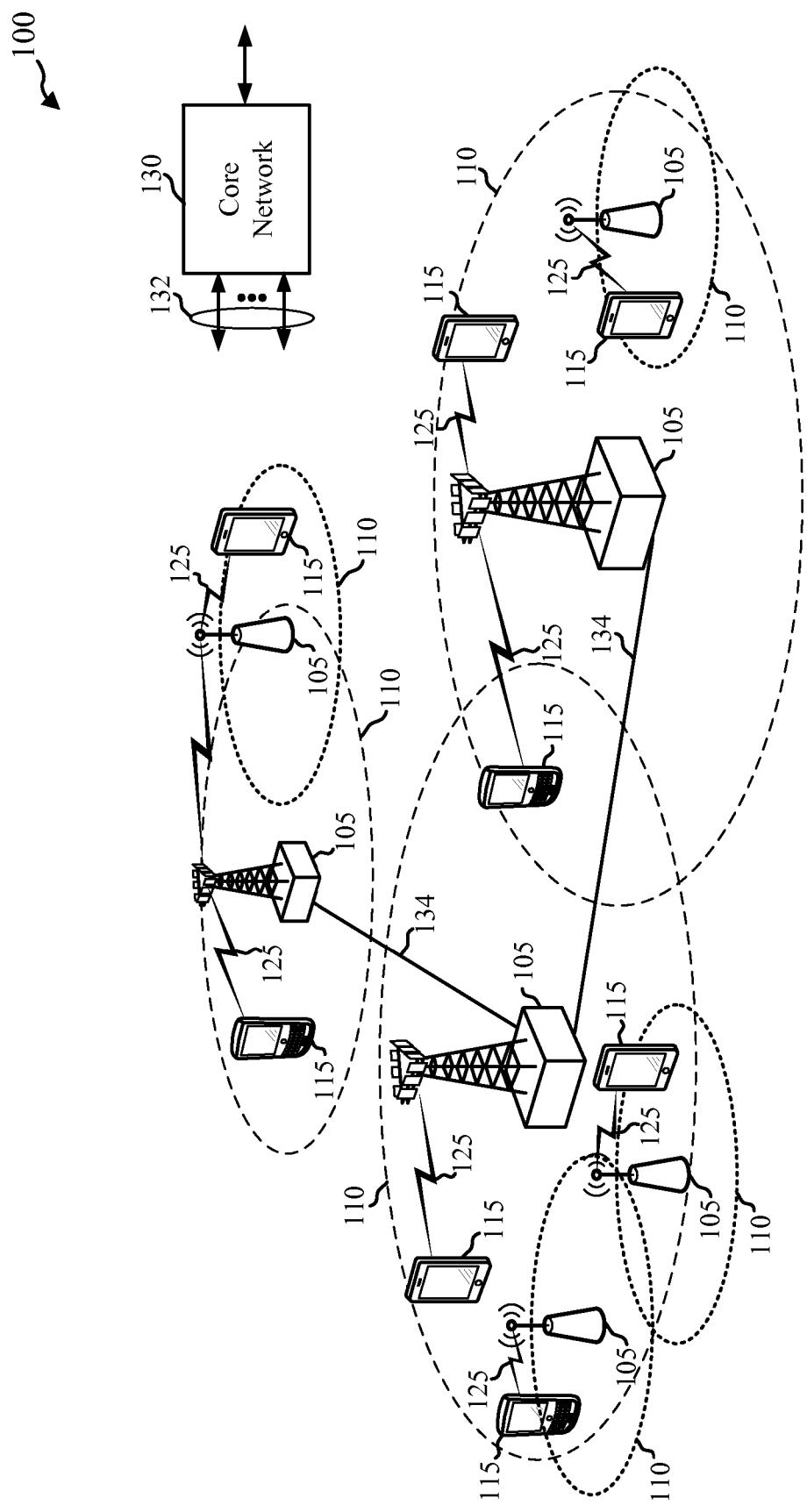
FIG. 1 shows a block diagram of a wireless communications system.

Based on changing channel conditions, a user equipment (UE) may decide to perform an antenna switch. In an antenna switch, the antenna coupled to a transmit chain and/or a receive chain of the UE may be switched. For example, an antenna coupled to a transmit (Tx) chain may be switched as a result of deterioration of the UE's transmit quality. However, when the antenna for the Tx chain is switched, it may necessitate an antenna switch for one or more of the UE's receive (Rx) chains. For example, the antenna that is switched to be the antenna for the Tx chain may have formerly been an antenna for a Rx chain, thereby necessitating an antenna switch for the Rx chain. As another example, the Tx chain may share an antenna with a Rx chain, such that an antenna switch for the Tx chain necessitates an antenna switch for the Rx chain. In some cases, an antenna switch may involve a swap of two antennas, in which the first antenna is shared by a Tx Chain 0 and a Rx Chain 0, and in which the second antenna is used only by a Rx Chain 1. During a swap of these two antennas, an antenna switch may be performed for each of the Tx Chain 0, the Rx Chain 0, and the Rx Chain 1.

When the antenna for a Tx chain or a Rx chain is switched, there may be a settling time associated with the antenna switch. By way of example, the settling time may include a transition time during which the hardware switch itself settles to its new position, as well as a settling time for each of the Tx chain's transmitter loops or the Rx chain's receiver loops (e.g., in the case of a Rx chain, a Rx automatic gain control (AGC) loop, a frequency/time correction loop, and/or a channel response loop). During the settling time, a Rx chain may be prone to data loss.

When an antenna switch is triggered at a sub-frame boundary, a UE may fail to decode the Physical Control Format Indicator Channel (PCFICH), Physical Downlink Control Channel (PDCCH), and Physical Hybrid ARQ Indicator Channel (PHICH) of the sub-frame. Because the downlink control information (DCI) of the sub-frame is lost (i.e., because it is transmitted in the PDCCH and not decoded), the UE may be unable to decode a Physical Downlink Shared Channel (PDSCH) scheduled in the sub-frame. If the lost PDCCH contained an uplink grant for a subsequent uplink sub-frame, the UE may also lose the grant information and fail to initiate an uplink transmission at the appropriate time. Also, if the lost PDCCH contained an acknowledgement from a base station (e.g., on the PHICH), the UE will fail to receive the acknowledgement and may unnecessarily retransmit an uplink sub-frame that was already received by the base station.

The methods, systems, and/or apparatuses described herein recognize that the PCFICH, PHICH and PDCCH (e.g., where the UE receives DL assignment and UL grant information) are contained in the first one to four OFDM symbols (e.g., as signaled in PCFICH), and determine when to trigger an antenna switch based at least in part on a settling time associated with the antenna switch. When possible, a UE may delay an antenna switch until after a duration of a PDCCH decode, and until a sub-frame in which PDSCH is absent. Otherwise, a UE may delay an antenna switch until after a duration of a PDCCH or trigger an antenna switch at the start of a sub-frame. In any event, the trigger time may be dynamically adjusted based on the identified settling time associated with the antenna switch.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, user equipments (UEs) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective geographic coverage area 110. In some embodiments, a base station 105 may be referred to as a base transceiver station, a radio base station, an access point, a radio transceiver, a basic service set (BSS), an extended service set (ESS), a NodeB, eNodeB (eNB), a Home NodeB, a Home eNodeB, or some other suitable terminology. The coverage area 110 for a base station 105 may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the term evolved Node B (eNB) may be generally used to describe one or more of the base stations 105. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In some embodiments of the system 100, a UE 115 may determine that its transmissions have deteriorated and initiate an antenna switch. For example, the UE 115 may electronically initiate a switch in a transmit antenna. This may in turn, however, necessitate the switch of a receive antenna (e.g., a swap of the transmit antenna with the receive antenna, and/or the switch of an antenna for a receive chain that shares the transmit antenna. The antenna switch(es) may result in a sudden change in the received signal level or strength seen by a demodulator coupled to one or more of the UE's receive chains, which sudden change may result in data loss until after a settling time. The data loss may result from the UE's inability to properly decode received data during the settling time. Methods, systems, and/or apparatuses that mitigate or avoid this data loss by dynamically adjusting the timing of the antenna switch, based at least in part on an identified settling time associated with the antenna switch, are described herein.

Figure 2:
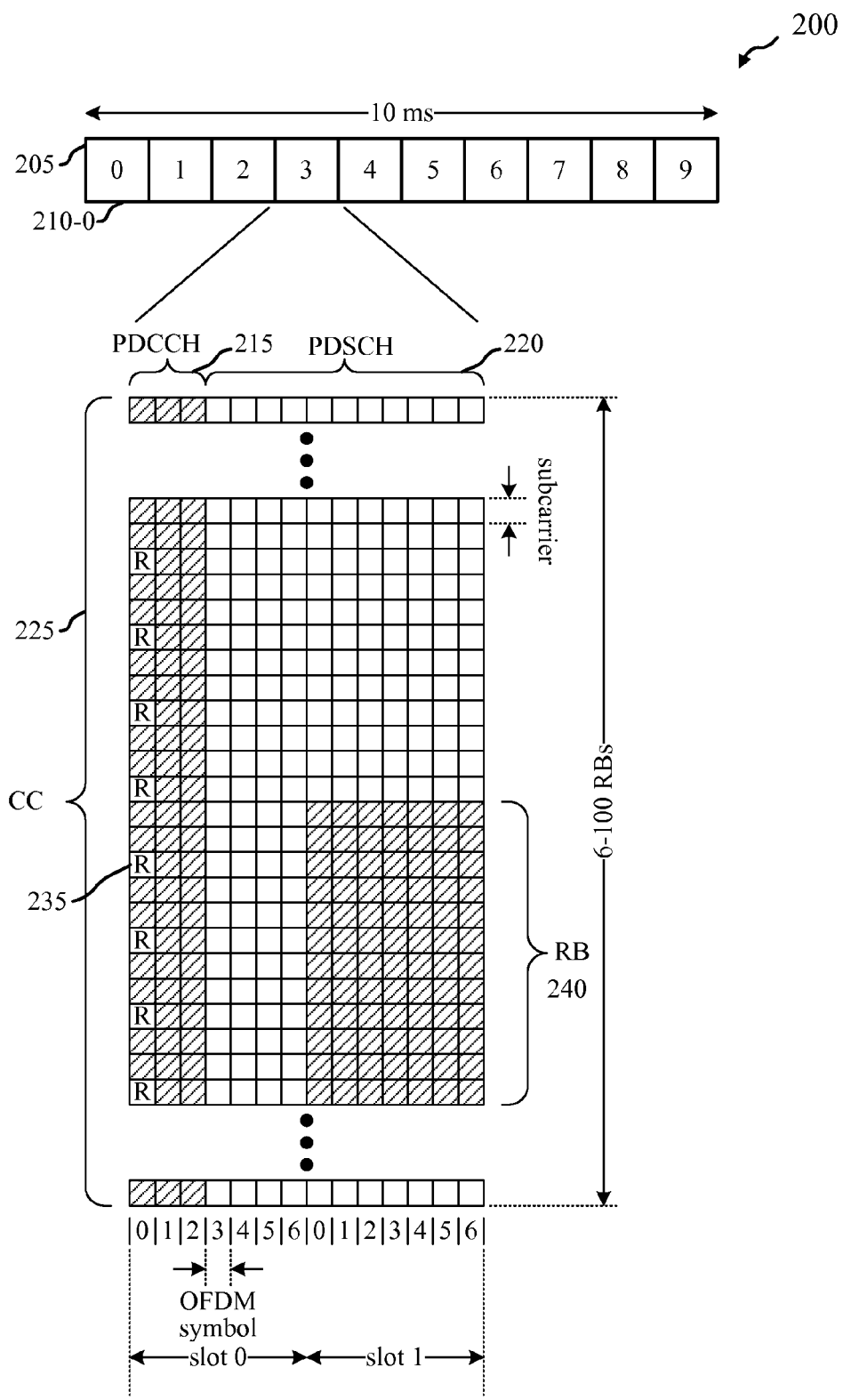
FIG. 2 is a diagram illustrating an example of a downlink frame structure that may be used in a wireless communications system.

FIG. 2 is a diagram illustrating an example of a downlink frame structure 200 that may be used in a wireless communications system, including the wireless communications system 100 described with reference to FIG. 1. By way of example, the frame structure 200 may be used in LTE/LTE-A or similar systems. A frame 205 (10 ms) may be divided into 10 equally sized sub-frames (e.g., sub-frame 210-0, etc). Each sub-frame may include two consecutive time slots. An OFDMA component carrier 225 may be illustrated as a resource grid representing two time slots. The resource grid may be divided into multiple resource elements 235.

In LTE/LTE-a, a resource block 240 may contain 12 consecutive subcarriers in the frequency domain and, for a normal cyclic prefix in each OFDM symbol, 7 consecutive OFDM symbols in the time domain, or 84 resource elements. Some of the resource elements, designated R (e.g., 235), may include DL reference signals (DL-RS). The DL-RS may include Cell-specific RS (CRS) (also sometimes called common RS) and UE-specific RS (UE-RS). UE-RS may be transmitted only on the resource blocks upon which the corresponding physical DL shared channel (PDSCH) 220 is mapped. The number of bits carried by each resource element may depend on the modulation scheme. Thus, the more resource blocks that a UE receives and the higher the modulation scheme, the higher the data rate may be for the UE.

As illustrated in FIG. 2, PDCCH 215 is generally time-division multiplexed with PDSCH 220 and generally is fully distributed within the entire bandwidth of the component carrier 225 within a first region of each sub-frame 210. In the example illustrated in FIG. 2, PDCCH 215 takes up the first three symbols of the sub-frame 210. PDCCH 215 may have more or fewer symbols as is appropriate based on the component carrier bandwidth and amount of control information for the sub-frame 210. The PHICH and/or PCFICH channels may be found in the first symbol of PDCCH 215 (not shown).

The PDCCH carries downlink control information (DCI) in control channel elements (CCEs). The DCI includes information regarding the downlink scheduling assignments, uplink resource grants, transmission scheme, uplink power control, hybrid automatic return repeat request (HARQ) information, modulation and coding schemes (MCS) and other information. A DCI can be UE-specific (dedicated) or cell-specific (common) and placed in different dedicated and common search spaces within the PDCCH depending on the format of the DCI. A UE attempts to decode the DCI by performing a process known as a blind decode, during which a plurality of decode attempts are carried out in the search spaces until the DCI is detected.

The size of the DCI messages can differ depending on the type and amount of information that is carried by the DCI. For example, if spatial multiplexing is supported, the size of the DCI message is larger compared to scenarios where contiguous frequency allocations are made. Similarly, for a system that employs MIMO, the DCI must include additional signaling information that is not needed for systems that do not utilize MIMO. Accordingly, the DCI has been categorized in different formats that are suited for different configurations. The size of a DCI format depends not only on the amount of information that is carried within the DCI message, but also on other factors such as the transmission bandwidth, the number of antenna ports, TDD or FDD operating mode, etc.

It should be noted that in some systems, the DCI messages are also appended with cyclic redundancy check (CRC) bits to for error detection. The coded DCI bits are then mapped to control channel elements (CCEs) according to the DCI format. A PDCCH can carry DCI messages associated with multiple user equipments. A particular user equipment must, therefore, be able to recognize the DCI messages that are intended for that particular user equipment. To that end, a user equipment is assigned certain identifiers (e.g., a cell radio network temporary identifier—C-RNTI) that facilitate the detection of the DCI associated with that user equipment. To reduce signaling overhead, the CRC bits that are attached to each DCI payload are scrambled (e.g., masked) with the identifier (e.g., C-RNTI) associated with a particular user equipment and/or an identifier that is associated with a group of user equipments. In an operation known as a "blind decode," the user equipment can descramble (or de-mask) all potential DCI messages using its unique identifier, and perform a CRC check on the DCI payload. If the CRC check passes, the content of the control channel is declared valid for the user equipment, which can then process the DCI.

When an antenna switch for a Rx chain is triggered at a sub-frame boundary, such as sub-frame 210-0, the UE may fail to decode the PCFICH, PDCCH, and (PHICH) of the sub-frame. The DCI of the sub-frame may also be lost because it is transmitted in the PDCCH. As a result, the UE may be unable to decode a PDSCH scheduled in the sub-frame 210-0. If the lost PDCCH contained an uplink grant for a subsequent uplink sub-frame, the UE may also lose the grant information and fail to initiate an uplink transmission at the appropriate time. Also, if the lost PDCCH contained an acknowledgement from a base station (e.g., on the PHICH), the UE will fail to receive the acknowledgement and may unnecessarily retransmit an uplink sub-frame that was already received by the base station.

In one embodiment, a UE may determine when to trigger an antenna switch affecting a Rx chain based at least in part on a settling time associated with the antenna switch. When possible, a UE may delay an antenna switch until after a duration of a PDCCH decode, and until a sub-frame in which PDSCH is absent. Otherwise, a UE may delay an antenna switch until after a duration of a PDCCH, or may trigger an antenna switch at the start of a sub-frame.

To reduce power consumption and overhead at the UE, a limited set of control channel element (CCE) locations can be specified, wherein the set of CCE locations include locations at which a DCI payload associated with a particular UE can be placed. For example, a CCE may consist of nine logically contiguous resource element groups (REGs), where each REG contains 4 resource elements (REs). Each RE is one frequency-time unit. CCEs can be aggregated at different levels (e.g., 1, 2, 4 and 8) depending on the DCI format and the system bandwidth. The set of CCE locations in which the user equipment can find its corresponding DCI messages are considered a search space. The search space can be partitioned into two regions: a common CCE region or search space and a UE-specific (dedicated) CCE region or search space. The common CCE region is monitored by all UEs served by an eNodeB and can include information such as paging information, system information, random access procedures and the like. The UE-specific CCE region includes user-specific control information and is configured individually for each user equipment. CCEs are numbered consecutively and common search spaces and UE-specific search spaces may span overlapping CCEs. The common search space always starts from CCE 0, while UE specific search spaces have starting CCE indices that depend on the UE ID (e.g., C-RNTI), the subframe index, the CCE aggregation level and other random seeds.

In LTE/LTE-A, acknowledgement/negative acknowledgement (ACK/NACK) for downlink control information is performed by Hybrid ARQ Acknowledgement (HARQ-ACK) using the PUCCH. PUCCH resources for HARQ-ACK may be determined based on the number of the first CCE (i.e. lowest CCE index used to construct the PDCCH) used for transmission of the corresponding DCI assignment and other information (e.g., PUCCH offset, etc.) configured by higher layers. For FDD operation, HARQ-ACK for detected control information on the PDSCH may be reported in a PUCCH sub-frame determined based on the PDSCH sub-frame (e.g., n−4, etc.). For TDD operation, HARQ-ACK for detected control information may be reported in a PUCCH sub-frame that depends on the TDD association set M.

When transmission diversity is used to transmit data, multiple versions of the same data may be transmitted over multiple channels. Each of the channels may be defined according to one or more partitions in a time domain (e.g., time slots), frequency domain (e.g., subcarriers), coding domain (e.g., CDMA coding), or antenna/direction (e.g., different antenna ports). Thus, using the example frame structure 200 of FIG. 2, transmission diversity may be achieved by transmitting the different versions of the data using different resource elements. However, transmission diversity may also be achieved by transmitting the different versions of the data using the same resource elements and different coding, antennas, or direction. Thus, a UE or base station that receives an interference signal corresponding to certain resource elements in a frame may monitor other resource elements for different versions of the same interference signal. The UE or base station may further monitor the same or different resource elements with respect to other coded or directional channels for different versions of the interference signal. If the UE or base station determines that transmission diversity is used with respect to the interference signal, the UE or base station may combine two or more of the received versions of the interference signal to estimate and cancel the interference signal.

Figure 3:
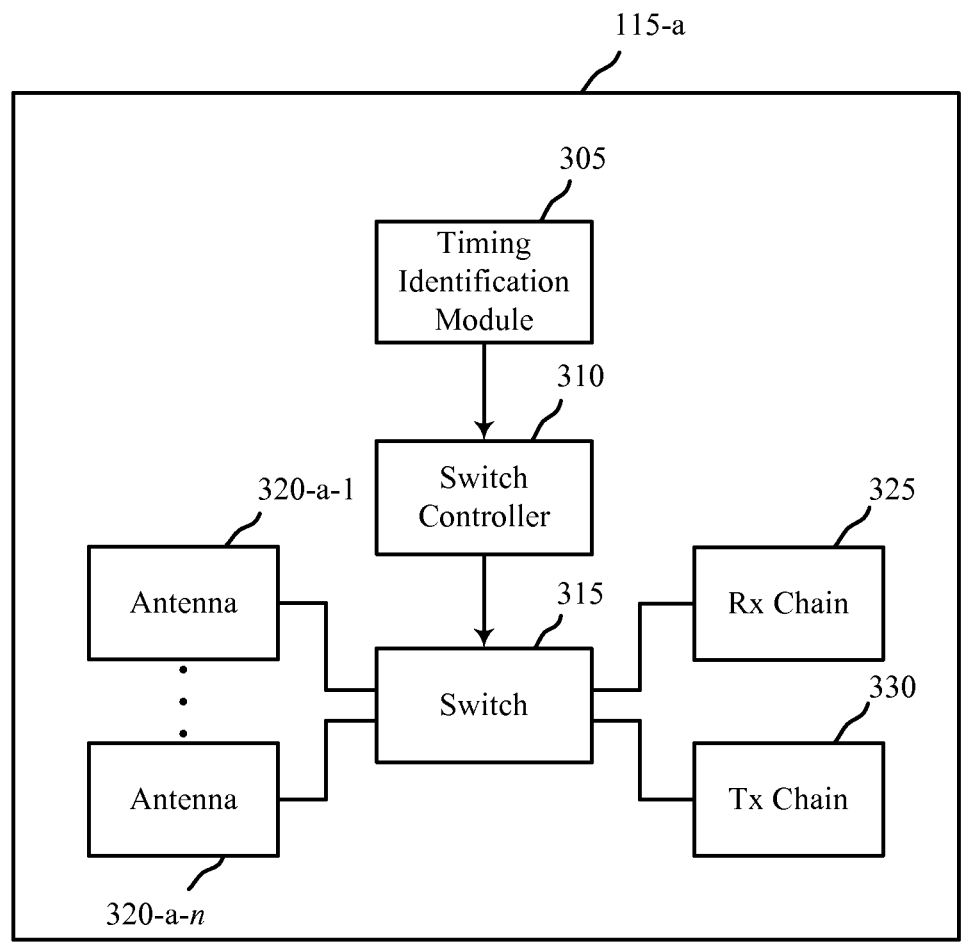
FIG. 3 is a block diagram of a user equipment in accord with various embodiments.

Referring now to FIG. 3, a block diagram 300 illustrates a UE 115-a in accordance with various embodiments. The UE 115-a may be an example of one or more aspects of one of the UEs 115 described with reference to FIG. 1. The UE 115-a may also be a processor. The UE 115-a may include a timing identification module 305, a switch controller 310, a switch 315, a plurality of antennas 320-a-1 to 320-a-n, at least one receive (Rx) chain 325, and/or at least one transmit (Tx) chain 330. Each of these components may be in communication with each other.

The components of the UE 115-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The switch 315 may couple a respective one of the antennas 320-a-1 to 320-a-n to each Rx chain, such as the Rx chain 325. The switch 315 may also couple a respective one of the antennas 320-a-1 to 320-a-n to each Tx chain, such as the Tx chain 330. In some cases, a single antenna 320 may be shared by both a Rx chain and a Tx chain. At times the UE 115-a and/or a base station 105 with which the UE 115-a communicates may initiate an antenna switch. For example, the UE 115-a may determine that its transmissions are not being received by a base station 105 or that a channel quality indicator for a transmit channel is poor. Upon making such a determination, the UE 115-a may switch the antenna coupled to the Tx chain 330 in an attempt to improve transmission performance. However, switching the antenna coupled to the Tx chain 330 may require a switch in the antenna coupled to the Rx chain 325 (e.g., an antenna swap).

Following the antenna switch for the Rx chain 325, there may be a time period in which received signals are not properly decoded and some of the data intended for the UE 115-a is lost. This period may be a result of a "settling time," in which the switch settles to its new position and the various receiver loops (e.g., Rx automatic gain control (AGC), frequency/time correction, and/or channel response) of the Rx chain 325 settle to the new channel conditions. In the past, an antenna switch has typically been implemented at the beginning of a sub-frame. However, as described with reference to FIG. 2, the beginning of a sub-frame may contain important data that, if lost, may make it impossible for the UE 115-a to decode data received later in the sub-frame and/or in other sub-frames. The loss of data at the beginning of a sub-frame may also cause the UE 115-a to re-transmit data that a base station 105 already received (e.g., because the UE 115-a fails to receive and decode an acknowledgement from the base station) or fail to transmit data when allowed (e.g., because the UE 115-a fails to receive and decode an uplink grant provided by a base station 105). To mitigate the issues arising from data loss during the antenna switch settling time, the timing identification module 305 may identifying a settling time, which settling time may include an estimated delay in reception attributable to settling following an antenna switch. Based at least in part on the identified settling time, the timing identification module 305 may then determine a time to trigger the antenna switch (i.e., a "trigger time"). The trigger time may in some cases be at the beginning of a sub-frame, or at some point during receipt of the sub-frame, or at the beginning or some interim point of a subsequent sub-frame.

The trigger time determined by the timing identification module 305 may be provided as an instruction or signal to program the switch controller 310. The switch controller 310 may then operate the switch 315 at the appropriate time to initiate the antenna switch.

Figure 4:
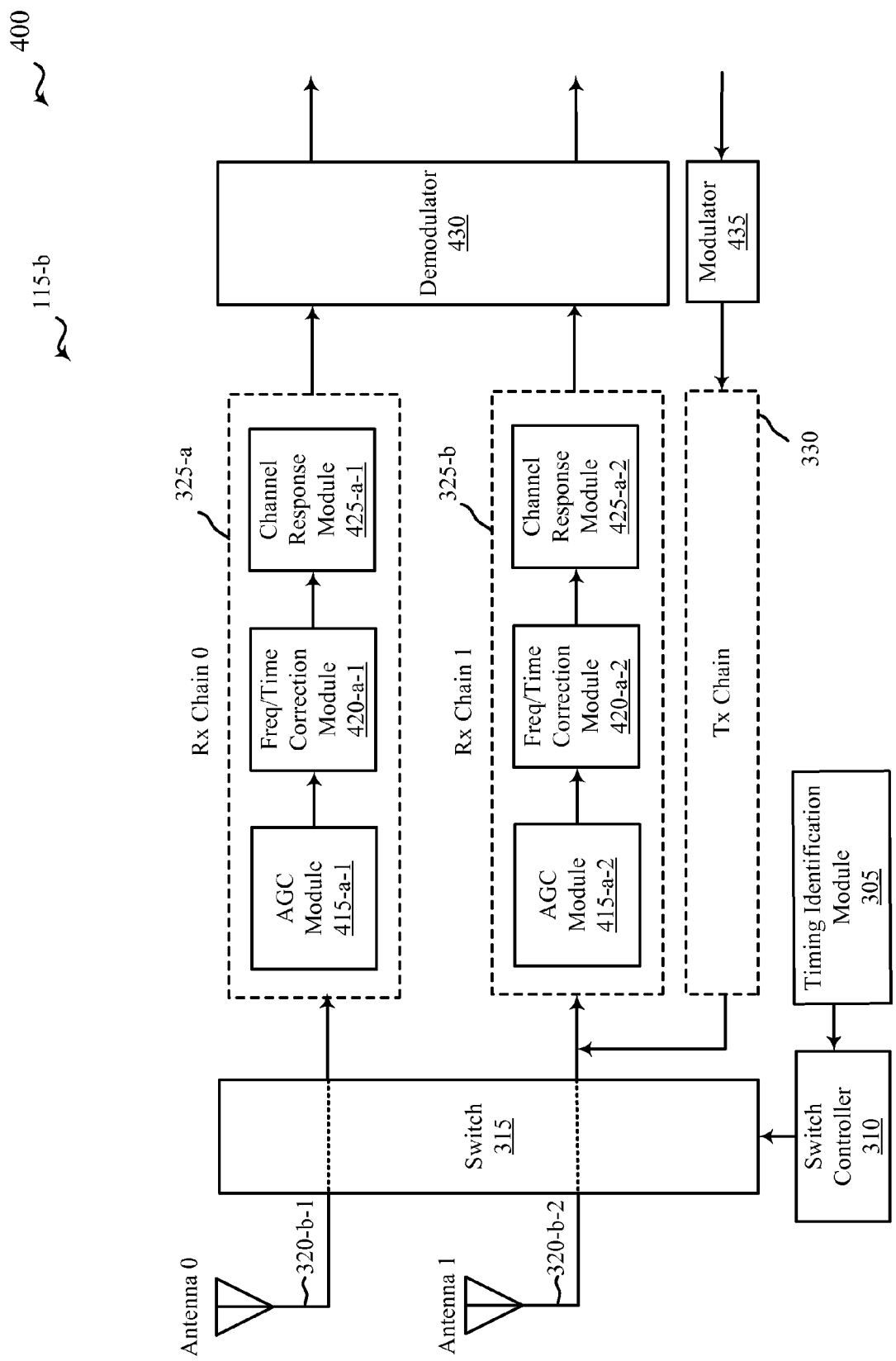
FIG. 4 is another block diagram of a user equipment in accordance with various embodiments.

Turning to FIG. 4, a block diagram 400 illustrates a UE 115-b. The UE 115-b may be an example of one or more aspects of one of the UEs 115 described with reference to FIGS. 1 and/or 3. The UE 115-b may also be a processor. The UE 115-b may include a timing identification module 305, a switch controller 310, a switch 315, a plurality of antennas 320-b-1, 320-b-2, a plurality of Rx chains 325-a, 325-b, a Tx chain 330, a demodulator 430, and/or a modulator 435. Each of these components may be in communication with each other, directly or indirectly.

The components of the UE 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Each of the timing identification module 305, the switch controller 310, the switch 315, the plurality of antennas 320-b-1, 320-b-2, the Rx chains 325, and the Tx chain 330 may be an example of one or more aspects of similarly numbered components described with reference to FIG. 3. The demodulator 430 may receive and demodulate the output of each Rx chain 325-a, 325-b and provide the UE 115-b with demodulated signals for further processing. The modulator 435 may modulate data to be transmitted from the UE 115-b and may provide modulated data to the input of the Tx chain 330.

As shown, the Rx Chain 0 325-a may include an automatic gain control (AGC) module 415-a-1, a frequency and time (freq/time) correction module 420-a-1, and/or a channel response module 425-a-1. In response to an antenna switch or other event imparting a change in signal behavior, the AGC module 415-a-1 may automatically determine an appropriate gain for the Rx Chain 0 325-a and adjust the gain accordingly. Similarly, the freq/time correction module 420-a-1 and channel response module 425-a-1 may determine appropriate parameters for the Rx Chain 0 325-a and adjust those parameters accordingly.

The Rx Chain 1 325-b may include its own AGC module 415-a-2, freq/time correction module 420-a-2, and/or channel response module 425-*a*-2, each of which may function similarly to its corresponding component in the Rx Chain 0 325-*a*.

During operation, the Antenna 0 320-*b*-1 may initially be coupled to the Rx Chain 0 325-*a*, and the Antenna 1 320-*b*-2 may be coupled to the Rx Chain 1 325-*b* and the Tx Chain 330 (i.e., the Antenna 1 320-*b*-2 is shared by the Rx Chain 1 325-*b* and the Tx Chain 330). However, at some point in time, the UE 115-*b* and/or a base station 105 with which the UE 115-*b* communicates may initiate an antenna switch. For example, the UE 115-*b* may determine that its transmissions are not being received by a base station 105 or that a channel quality indicator for a transmit channel is poor. Upon making such a determination, the UE 115-*b* may, for example, switch the Antenna 0 320-*b*-1 and the Antenna 1 320-*b*-2. In this manner, the Antenna 0 320-*b*-1 is decommissioned for use by the Rx Chain 0 325-*a* and commissioned for use by the Rx Chain 1 325-*b* and the Tx Chain 330. Similarly, the Antenna 1 320-*b*-2 is decommissioned for use by the Rx Chain 1 325-*b* and the Tx Chain 330 and commissioned for used by the Rx Chain 0 325-*a*.

Following the antenna switch for each of the Rx Chains 325-*a*, 325-*b*, there may be a time period in which received signals are not properly decoded and some data intended for the UE 115-*b* is lost. As discussed with reference to FIG. 3, this period may be a result of a "settling time" in which the switch settles to its new position and the various receiver loops (e.g., Rx AGC, frequency/time correction, and/or channel response) of the Rx Chains 325-*a*, 325-*b* settle to their new channel conditions. To mitigate the issues arising from data loss during the antenna switch settling time, the timing identification module 305 may identify a settling time for each Rx chain 325-*a*, 325-*b*, each settling time of which may include an estimated delay in reception attributable to settling following the antenna switch. Based at least in part on the identified settling time, the timing identification module 305 may then determine a time to trigger the antenna switch (i.e., a "trigger time"). The trigger time may in some cases be at the beginning of a sub-frame, at some interim point during receipt of the sub-frame, or at the beginning or some interim point of a subsequent sub-frame.

The trigger time determined by the timing identification module 305 may be provided as an instruction or signal to program the switch controller 310. The switch controller 310 may then operate the switch 315 at the appropriate time to initiate the antenna switch.

Figure 5:
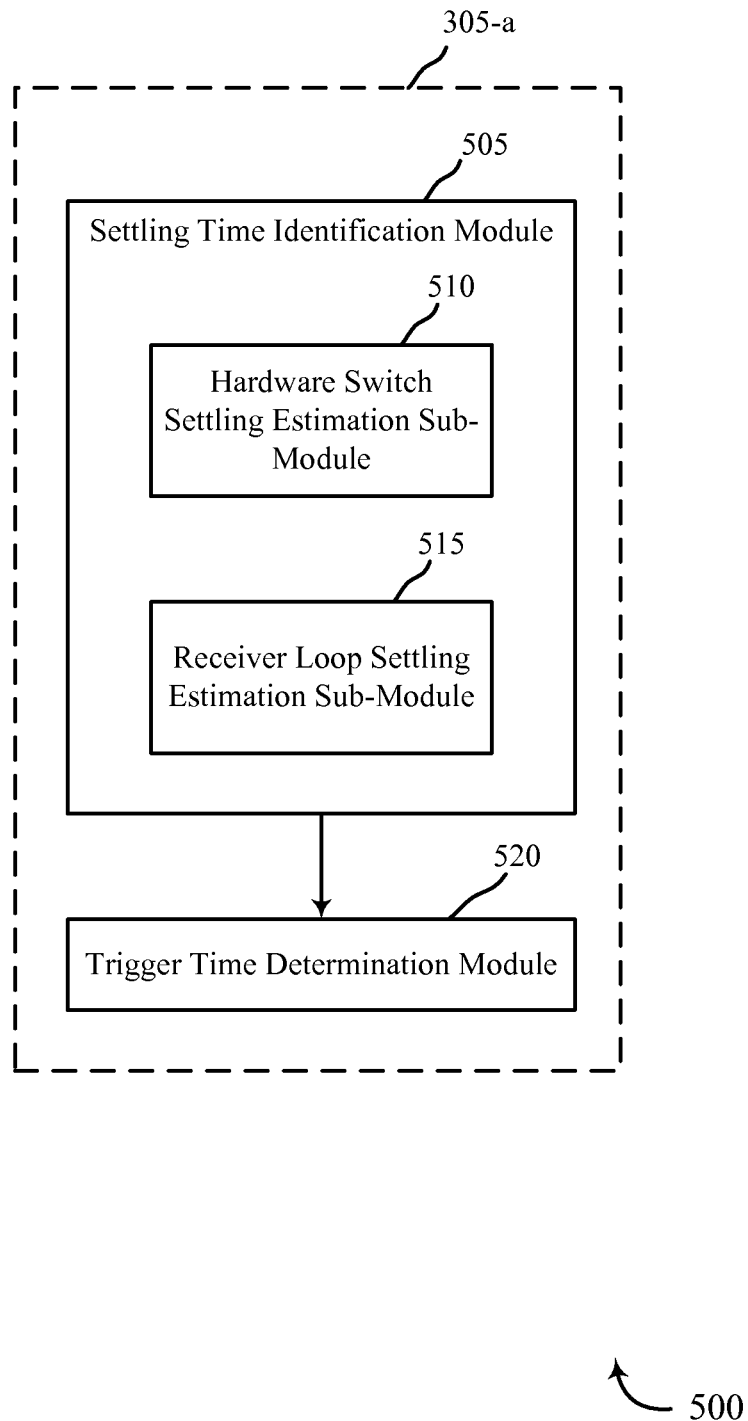
FIG. 5 is a block diagram of a timing identification module in accordance with various embodiments.

Referring now to FIG. 5, a block diagram 500 illustrates an example of a timing identification module 305-*a* in accordance with various embodiments. The timing identification module 305-*a* may be an example of one or more aspects of the timing identification module 305 described with reference to FIGS. 3 and/or 4. The timing identification module 305-*a* may include a settling time identification module 505 and a trigger time determination module 520. Each of these components may be in communication with each other.

The settling time identification module 505 may identify a settling time corresponding to a desired antenna switch. The settling time may include, for example, an estimated delay in reception attributable to settling following the desired antenna switch (e.g., a delay before the demodulator 430 can accurately decode the output of an Rx chain 325, as previously described with reference to FIG. 4). In some cases, the delay in reception may be estimated using one or both of a hardware switch settling estimation sub-module 510 and a receiver loop settling estimation sub-module 515. The hardware switch settling estimation sub-module 510 may estimate a time for a hardware switch to settle following a transition (e.g., a time for one of the switches included in the switch 315 described with reference to FIGS. 3 and/or 4 to settle following a transition). Often, the abrupt closing of a switch will impart unwanted oscillations to the signal, if any, propagating through the switch. The time during which these unwanted oscillations interfere with the decoding of the signal may be classified as a settling time attributable to the hardware switch.

The receiver loop settling estimation sub-module 515 may estimate a time for the various receiver loops to settle following an antenna switch. The receiver loops may include, for example, one or more of the loops defined at least in part by the AGC module 415-*a*-1, freq/time correction module 420-*a*-1, and/or channel response module 425-*a*-1 described with reference to FIG. 4. The time during which these receiver loops are adjusting to changes in the conditions of a receive chain (e.g., Rx Chain 0 325-*a*) may be classified as a settling time attributable to the receiver loops.

In some cases, the reception delay may itself be the settling time. In other cases, the reception delay may be used to identify the settling time by, for example: combining the reception delay with one or more other delays, increasing the reception delay by a predetermined cushion, or using the reception delay as an index to lookup the settling time.

The settling time identification module 505 may in some cases identify a settling time based on one or both of the settling times attributable to the transition of a hardware switch and the settling of one or more receiver loops. The identified settling time may then be provided to the trigger time determination module 520.

The trigger time determination module 520 may determine a time to trigger the desired antenna switch (i.e., a "trigger time"). The determination of the trigger time may be based at least in part on the identified settling time. The trigger time may in some cases be at the beginning of a sub-frame, or at some point during receipt of the sub-frame, or at the beginning or some interim point of a subsequent sub-frame.

Figure 6:
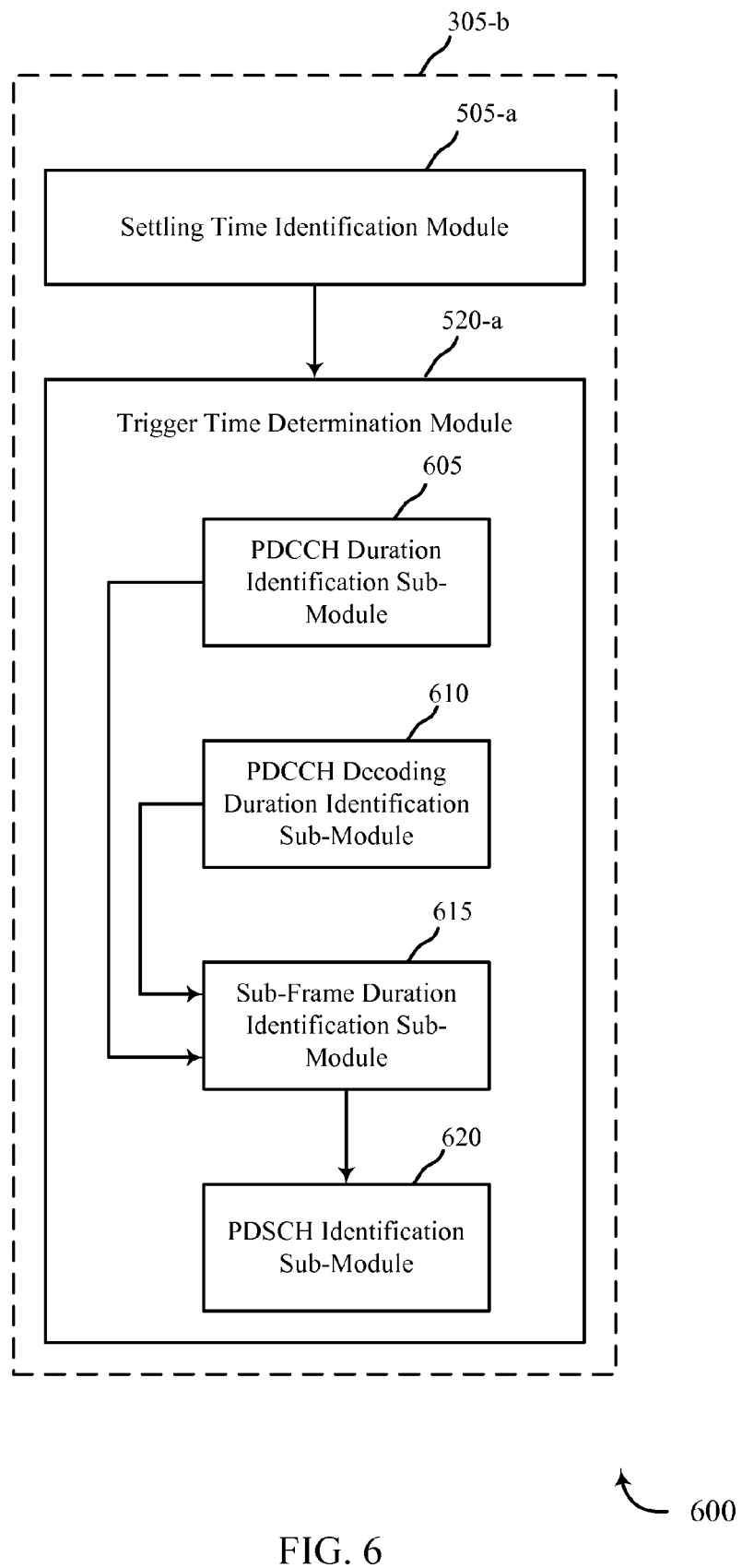
FIG. 6 is a block diagram of another timing identification module in accordance with various embodiments.

Referring now to FIG. 6, a block diagram 600 illustrates an example of a timing identification module 305-*b* in accordance with various embodiments. The timing identification module 305-*b* may be an example of one or more aspects of the timing identification module 305 described with reference to FIGS. 3, 4, and/or 5. The timing identification module 305-*b* may include a settling time identification module 505-*a* and a trigger time determination module 520-*a*. Each of these components may be in communication with each other.

The settling time identification module 505-*a* may in some cases be configured as described with reference to FIG. 5.

The trigger time determination module 520-*a* may include a PDCCH duration identification sub-module 605, a PDCCH decoding duration identification sub-module 610, a sub-frame duration identification sub-module 615, and/or a PDSCH identification sub-module 620. The PDCCH duration identification sub-module 605 may identify a duration of the PDCCH portion of a current sub-frame being received by a UE 115 (e.g., a duration extending from the time the sub-frame starts to be received by the UE 115 until the time the PDCCH is fully received by the UE 115). The PDCCH decoding duration identification sub-module 610 may identify a duration of the PDCCH decoding for the current sub-frame (e.g., a duration extending from the time the sub-frame starts to be received by the UE 115 until the time the PDCCH is fully decoded by the UE 115; or a duration extending from the time a sub-frame starts to be received by the UE 115 until the time that certain information contained in the PDCCH is decoded by the UE 115). The sub-frame duration identification sub-module 615 may identify a duration of the current sub-frame (e.g., a "sub-frame duration"; or a duration extending from the time the sub-frame starts to be received by the UE 115 until the time the sub-frame is fully received by the UE 115). The sub-frame duration identification sub-module 615 may also receive the duration identified by the PDCCH duration identification sub-module 605 and determine a remaining time of the current sub-frame after a duration of the PDCCH of the current sub-frame (i.e., a "time remaining after receipt of PDCCH"). The sub-frame duration identification sub-module 615 may further receive the duration identified by the PDCCH decoding duration identification sub-module 610 and determine a remaining time of the current sub-frame after decoding the PDCCH of the current sub-frame (i.e., a "time remaining after PDCCH decode"). In some cases, one or more of the sub-modules 605, 610, and 615 may identify durations based on predetermined estimated durations. In other cases, one or more of the sub-modules 605, 610, and 615 may identify durations based on received signaling data.

The PDSCH identification sub-module 620 may determine, from the downlink control information (DCI) of the decoded PDCCH of the current sub-frame, whether a PDSCH is scheduled for the current sub-frame.

The trigger time determination module 520-a may use the various times or durations determined by the sub-modules 605, 610, and 615, as well as the identification (or not) of a scheduled PDSCH provided by the sub-module 620, to determine a time to trigger a desired antenna switch (i.e., a "trigger time"). Examples illustrating how the trigger time determination module 520-a may select a trigger time based on the outputs of the sub-modules 605, 610, 615, and 620 are illustrated in FIGS. 7, 8, 9, and 10.

Figure 7:
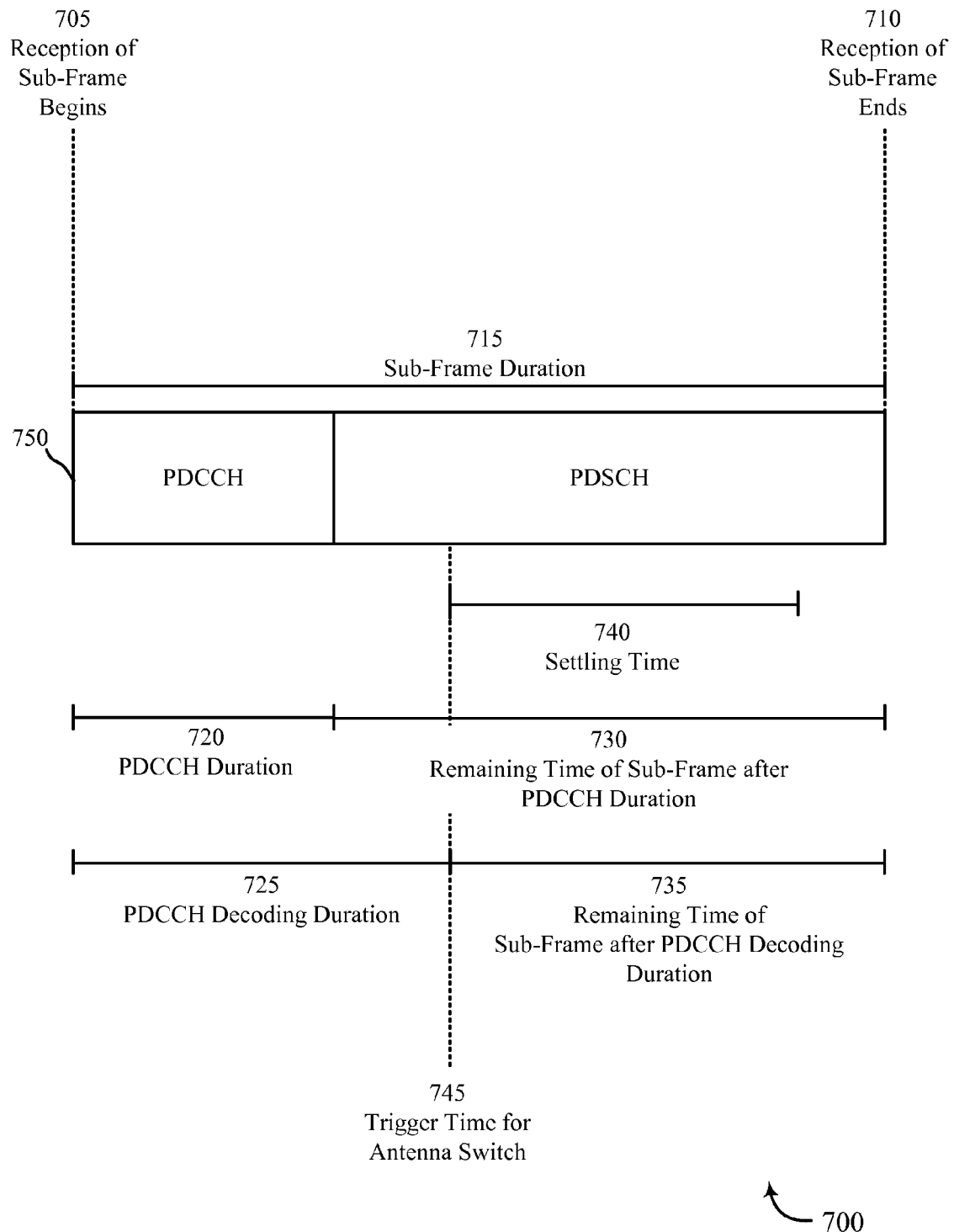
FIGS. 7, 8, 9, and 10 illustrate various timings for an antenna switch, in response to different identified settling times associated with the antenna switch.

Turning now to FIG. 7, a number of times and durations are identified with respect to the receipt of a current sub-frame 750. The sub-frame 750 includes a PDCCH portion and a PDSCH portion and may be received by a device such as one of the UEs 115 described with reference to FIGS. 1, 3, and/or 4.

Receipt of the sub-frame 750 by a UE 115 begins at a time 705 and ends at a time 710. The times 705 and 710 define a sub-frame duration 715, as may be determined by the sub-frame duration identification sub-module 615 described with reference to FIG. 6. In the case of an LTE/LTE-A sub-frame, the sub-frame duration 715 may be standardized at one millisecond (1 ms).

The time it takes the UE 115 to receive the PDCCH portion of the sub-frame 750 may be identified by the PDCCH duration identification sub-module 605 and is labeled in FIG. 7 as the PDCCH duration 720. The time it takes the UE 115 to decode the PDCCH portion of the sub-frame 750 (e.g., with respect to the start of the sub-frame 750) may be identified by the PDCCH decoding duration identification sub-module 610 and is labeled in FIG. 7 as the PDCCH decoding duration 725. The time of the sub-frame remaining after receipt of the PDCCH portion of the sub-frame 750 may be determined by the sub-frame duration identification sub-module 615 and is labeled in FIG. 7 as the remaining time of sub-frame after PDCCH duration 730. The time of the sub-frame remaining after the PDCCH has been decoded by the UE 115 may be determined by the sub-frame duration identification sub-module 615 and is labeled in FIG. 7 as the remaining time of sub-frame after PDCCH decoding duration 735.

Based on the estimated settling time 740 of a desired antenna switch, the trigger time 745 for the antenna switch may be determined by first comparing the settling time 740 to one or more of the sub-frame duration 715, the remaining time of sub-frame after PDCCH duration 730, and the remaining time of sub-frame after PDCCH decoding duration 735. The settling time 740 may first be compared to the shortest of the three durations—i.e., the remaining time of the sub-frame after PDCCH decoding duration 735. In the example shown in FIG. 7, the settling time 740 is shorter than the remaining time of the sub-frame after PDCCH decoding duration 735, and thus no further comparisons need be made. However, before a trigger time is determined, the trigger time determination module 520-a may wait for the PDCCH of the current sub-frame 750 to be decoded, to retrieve downlink control information (DCI). The trigger time determination module 520-a may then determine whether a PDSCH is scheduled in the current sub-frame 750 based at least in part on the DCI. Upon determining that a PDSCH is absent in the current sub-frame, the trigger time 745 for the antenna switch may be set to follow the PDCCH decoding duration 725. However, upon determining that a PDSCH is scheduled in the current sub-frame 750, the triggering of the antenna switch may be delayed until one of a number of sub-frames following the current sub-frame 750. For example, in one embodiment, a counter may be set to some number of sub-frames N (e.g., N=4). After determining that a PDSCH is scheduled in the current sub-frame N, N may be reduced by one (e.g., N=N−1) and the trigger time 745 for the antenna switch may be delayed until the next sub-frame. If N reaches zero (e.g., N=0) and a sub-frame without a scheduled PDSCH has yet to be found, the trigger time 745 may be set to follow the PDCCH decoding duration of the sub-frame being received when N=0. This may result in the loss of one PDSCH portion, but any uplink grant contained in the PDCCH portion of the sub-frame may still be decoded.

Figure 8:
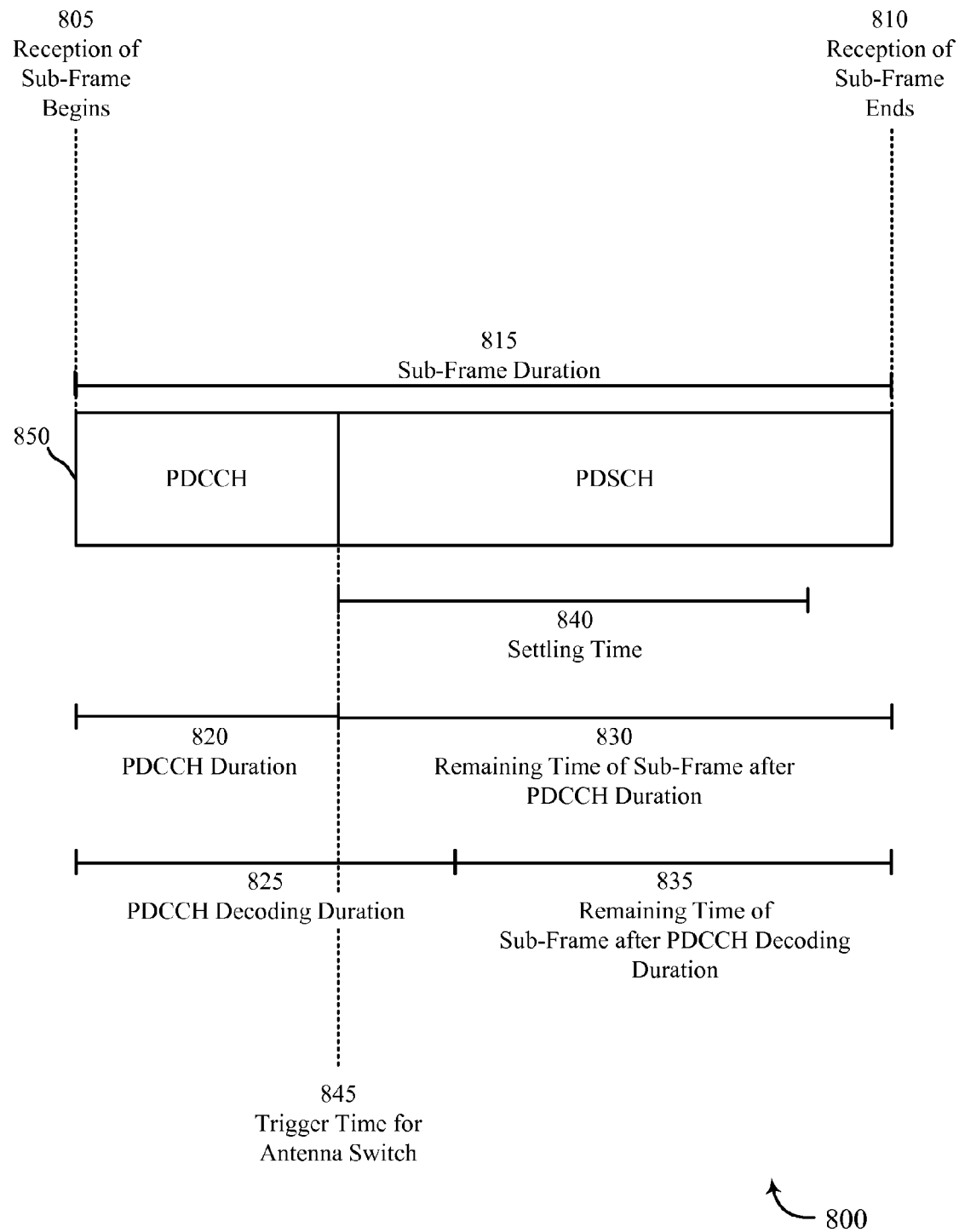

Turning now to FIG. 8, a number of times and durations are identified with respect to the receipt of a current sub-frame 850. The sub-frame 850 includes a PDCCH portion and a PDSCH portion and may be received by a device such as one of the UEs 115 described with reference to FIGS. 1, 3, and/or 4.

Receipt of the sub-frame by a UE 115 begins at a time 805 and ends at a time 810. The times 805 and 810 define a sub-frame duration 815, as may be determined by the sub-frame duration identification sub-module 615 described with reference to FIG. 6. In the case of an LTE/LTE-A sub-frame, the sub-frame duration 815 may be standardized at one millisecond (1 ms).

The time it takes the UE 115 to receive the PDCCH portion of the sub-frame 850 may be identified by the PDCCH duration identification sub-module 605 and is labeled in FIG. 8 as the PDCCH duration 820. The time it takes the UE 115 to decode the PDCCH portion of the sub-frame 850 (e.g., with respect to the start of the sub-frame 850) may be identified by the PDCCH decoding duration identification sub-module 610 and is labeled in FIG. 8 as the PDCCH decoding duration 825. The time of the sub-frame remaining after receipt of the PDCCH portion of the sub-frame 850 may be determined by the sub-frame duration identification sub-module 615 and is labeled in FIG. 8 as the remaining time of sub-frame after PDCCH duration 830. The time of the sub-frame remaining after the PDCCH has been decoded by the UE 115 may be determined by the sub-frame duration identification sub-module 615 and is labeled in FIG. 8 as the remaining time of sub-frame after PDCCH decoding duration 835.

Based on the estimated settling time 840 of a desired antenna switch, the trigger time 845 for the antenna switch may be determined by first comparing the settling time 840 to one or more of the sub-frame duration 815, the remaining time of sub-frame after PDCCH duration 830, and the remaining time of sub-frame after PDCCH decoding duration 835. The settling time 840 may first be compared to the shortest of the three durations—i.e., the remaining time of the sub-frame after PDCCH decoding duration 835. In the example shown in FIG. 8, the settling time 840 is longer than the remaining time of the sub-frame after PDCCH decoding duration 835. As a result, the settling time 840 may be compared to the next shortest of the three durations—i.e., the remaining time of the sub-frame after PDCCH duration 830. In this case, the settling time 840 is shorter than the remaining time of the sub-frame after PDCCH duration 830, and thus no further comparisons need be made.

If the trigger time 845 is set to occur after the PDCCH decoding duration 825 in FIG. 8, the PDCCH of the next sub-frame may be lost. Thus, a trigger time 845 for an antenna switch may be immediately following the PDCCH duration 820. In this manner, the PDCCH of the next sub-frame can be saved, and information obtainable from the current and next sub-frame PDCCH portions regarding uplink grants and base station acknowledgements may be received and ultimately decoded. The PDSCH of the current sub-frame, if any, may be lost. However, this loss may be less detrimental than loss of a PDCCH portion.

Figure 9:
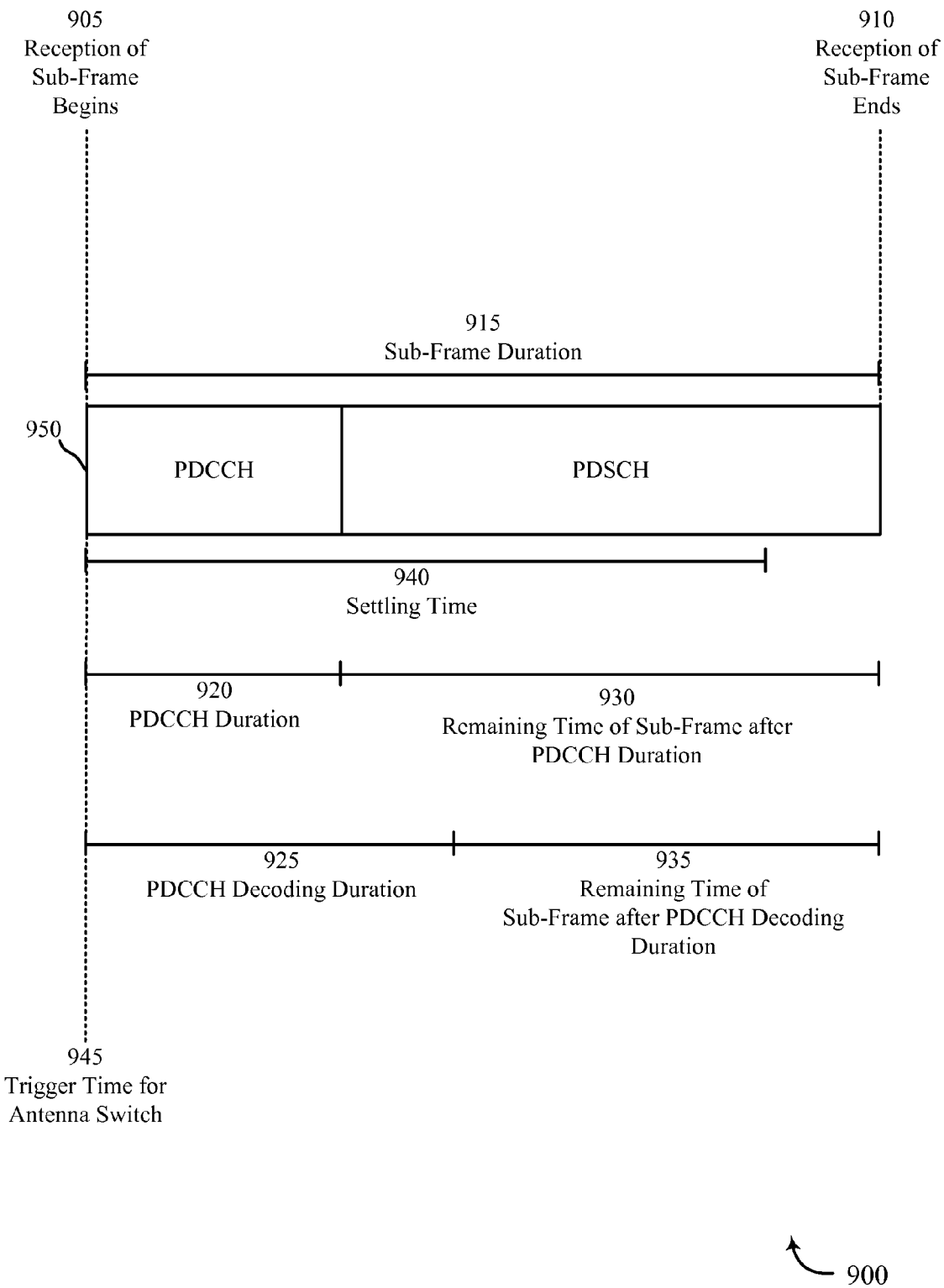

Turning now to FIG. 9, a number of times and durations are identified with respect to the receipt of a current sub-frame 950. The sub-frame 950 includes a PDCCH portion and a PDSCH portion and may be received by a device such as one of the UEs 115 described with reference to FIGS. 1, 3, and/or 4.

Receipt of the sub-frame by a UE 115 begins at a time 905 and ends at a time 910. The times 905 and 910 define a sub-frame duration 915, as may be determined by the sub-frame duration identification sub-module 615 described with reference to FIG. 6. In the case of an LTE/LTE-A sub-frame, the sub-frame duration 915 may be standardized at one millisecond (1 ms).

The time it takes the UE 115 to receive the PDCCH portion of the sub-frame 950 may be identified by the PDCCH duration identification sub-module 605 and is labeled in FIG. 9 as the PDCCH duration 920. The time it takes the UE 115 to decode the PDCCH portion of the sub-frame 950 (e.g., with respect to the start of the sub-frame 950) may be identified by the PDCCH decoding duration identification sub-module 610 and is labeled in FIG. 9 as the PDCCH decoding duration 925. The time of the sub-frame remaining after receipt of the PDCCH portion of the sub-frame 950 may be determined by the sub-frame duration identification sub-module 615 and is labeled in FIG. 9 as the remaining time of sub-frame after PDCCH duration 930. The time of the sub-frame remaining after the PDCCH has been decoded by the UE 115 may be determined by the sub-frame duration identification sub-module 615 and is labeled in FIG. 9 as the remaining time of sub-frame after PDCCH decoding duration 935.

Based on the estimated settling time 940 of a desired antenna switch, the trigger time 945 for the antenna switch may be determined by first comparing the settling time 940 to one or more of the sub-frame duration 915, the remaining time of sub-frame after PDCCH duration 930, and the remaining time of sub-frame after PDCCH decoding duration 935. The settling time 940 may first be compared to the shortest of the three durations—i.e., the remaining time of the sub-frame after PDCCH decoding duration 935. In the example shown in FIG. 9, the settling time 940 is longer than the remaining time of the sub-frame after PDCCH decoding 935. As a result, the settling time 940 may be compared to the next shortest of the three durations—i.e., the remaining time of the sub-frame after PDCCH duration 930. The settling time 940 is also longer than the remaining time of the sub-frame after PDCCH duration 930. As a result, the settling time 940 may be compared to the longest of the three times—i.e., the sub-frame duration 915. In this case, the settling time 940 is shorter than the sub-frame duration 915.

If the trigger time 945 is set to occur after the PDCCH decoding duration 925 or the PDCCH duration 920, the PDCCH of the next sub-frame and the PDSCH portions of both the current and next sub-frames may be lost. Thus, a trigger time 945 for an antenna switch may be at the start of the current sub-frame 950. In this manner, only one PDCCH and possibly one PDSCH will be lost, and the entirety of the next sub-frame can be saved. Because of the lost PDCCH in the current sub-frame 950, any uplink grant or acknowledgement that may have been received in the PDCCH of the current sub-frame 950 may be lost, leading to a loss of any PUSCH/PUCCH portion in a sub-frame received four sub-frames after the current sub-frame 950.

Figure 10:
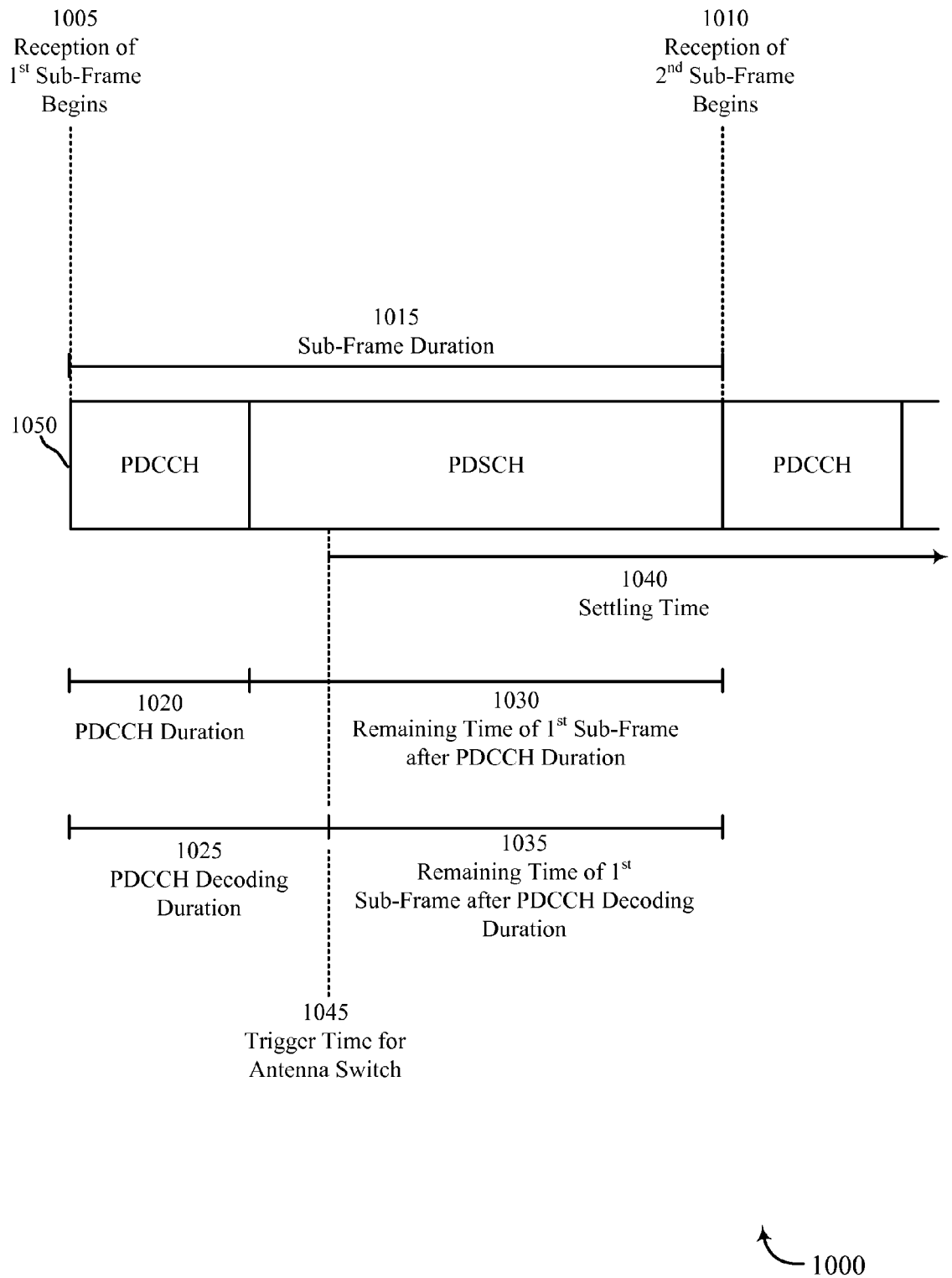

Turning now to FIG. 10, a number of times and durations are identified with respect to the receipt of a current sub-frame 1050. The sub-frame 1050 includes a PDCCH portion and a PDSCH portion and may be received by a device such as one of the UEs 115 described with reference to FIGS. 1, 3, and/or 4.

Receipt of the sub-frame by a UE 115 begins at a time 1005 and ends at a time 1010. The times 1005 and 1010 define a sub-frame duration 1015, as may be determined by the sub-frame duration identification sub-module 615 described with reference to FIG. 6. In the case of an LTE/LTE-A sub-frame, the sub-frame duration 1015 may be standardized at one millisecond (1 ms).

The time it takes the UE 115 to receive the PDCCH portion of the sub-frame 1050 may be identified by the PDCCH duration identification sub-module 605 and is labeled in FIG. 10 as the PDCCH duration 1020. The time it takes the UE 115 to decode the PDCCH portion of the sub-frame 1050 (e.g., with respect to the start of the sub-frame 1050) may be identified by the PDCCH decoding duration identification sub-module 610 and is labeled in FIG. 10 as the PDCCH decoding duration 1025. The time of the sub-frame remaining after receipt of the PDCCH portion of the sub-frame 1050 may be determined by the sub-frame duration identification sub-module 615 and is labeled in FIG. 10 as the remaining time of sub-frame after PDCCH duration 1030. The time of the sub-frame remaining after the PDCCH has been decoded by the UE 115 may be determined by the sub-frame duration identification sub-module 615 and is labeled in FIG. 10 as the remaining time of sub-frame after PDCCH decoding duration 1035.

Based on the estimated settling time 1040 of a desired antenna switch, the trigger time 1045 for the antenna switch may be determined by first comparing the settling time 1040 to one or more of the sub-frame duration 1015, the remaining time of sub-frame after PDCCH duration 1030, and the remaining time of sub-frame after PDCCH decoding duration 1035. The settling time 1040 may first be compared to the shortest of the three durations—i.e., the remaining time of the sub-frame after PDCCH decoding duration 1035. In the example shown in FIG. 10, the settling time 1040 is longer than the remaining time of the sub-frame after PDCCH decoding duration 1035. As a result, the settling time 1040 may be compared to the next shortest of the three durations—i.e., the remaining time of the sub-frame after PDCCH duration 1030. The settling time 1040 is also longer than the remaining time of the sub-frame after PDCCH duration 1030. As a result, the settling time 1040 may be compared to the longest of the three durations—i.e., the sub-frame duration 1015. In this case, the settling time 1040 is longer than the sub-frame duration 1015.

If the trigger time 1045 is set to occur at the start of the current sub-frame 1050, the PDCCH portions of the current and next sub-frames may be lost, as well as any uplink grant or acknowledgement information contained therein. The PDSCH, if any, of the current sub-frame may also be lost, and possibly the PDSCH of the next sub-frame. As a result, a trigger time 1045 for an antenna switch may be immediately following the PDCCH duration 1020. In this manner, the PDCCH of only one sub-frame (i.e., the next sub-frame) may be lost. However, if the settling time 1040 can be estimated to be less than the length of two sub-frames (e.g., 2 ms) minus the PDCCH decoding duration 1025 of the current sub-frame 1050, the trigger time determination module 520-a may wait for the PDCCH of the current sub-frame 1050 to be decoded, to retrieve downlink control information (DCI). The trigger time determination module 520-a may then determine whether a PDSCH is scheduled in the current sub-frame 1050 based at least in part on the DCI. Upon determining that a PDSCH is absent in the current sub-frame, the trigger time 1045 for the antenna switch may be set to follow the PDCCH decoding duration 1025. However, upon determining that a PDSCH is scheduled in the current sub-frame 1050, the triggering of the antenna switch may be delayed until one of a number of sub-frames following the current sub-frame 1050. For example, in one embodiment, a counter may be set to some number of sub-frames N (e.g., N=4). After determining that a PDSCH is scheduled in the current sub-frame N, N may be reduced by one (e.g., N=N-1) and the trigger time 1045 for the antenna switch may be delayed until the next sub-frame. If N reaches zero (e.g., N=0) and a sub-frame without a scheduled PDSCH has yet to be found, the trigger time 1045 may be set to follow the PDCCH decoding duration of the sub-frame being received when N=0. This may result in the loss of a PDCCH portion and up to two PDSCH portions, but any uplink grant contained in the PDCCH portion of the current sub-frame may still be decoded.

Figure 11:
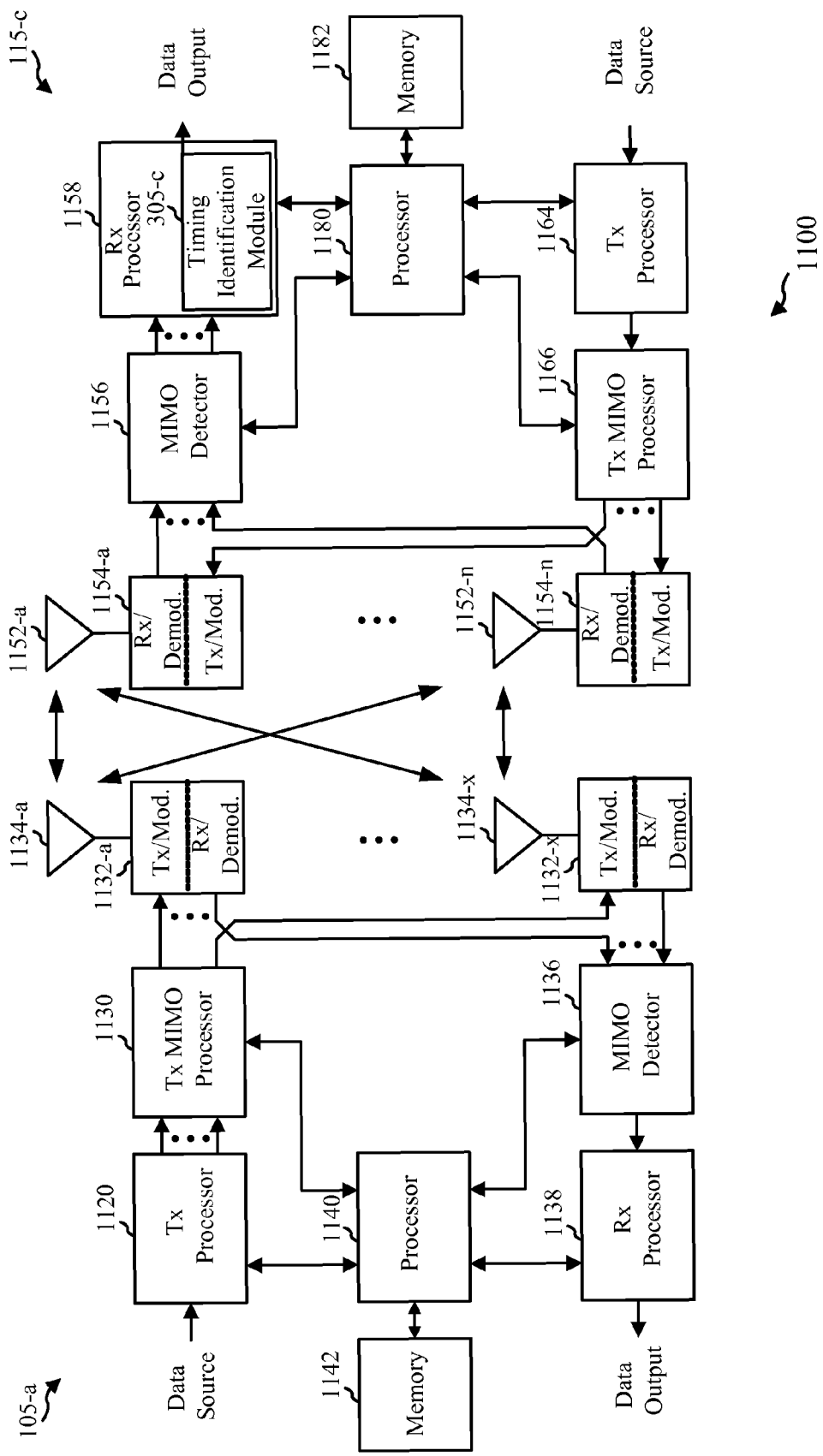
FIG. 11 is a block diagram of a multiple-input, multiple-output (MIMO) communication system in accordance with various embodiments.

FIG. 11 is a block diagram of a MIMO communications system 1100 including a base station 105-a and a UE 115-c. The base station 105-a may be an example of one of the base stations 105 described with reference to FIG. 1, while the UE 115-c may be an example of one of the UEs 115 described with reference to FIG. 1. The system 1100 may illustrate one or more aspects of the system 100 described with reference to FIG. 1. The base station 105-a may be equipped with antennas 1134-a through 1134-x, and the UE 115-c may be equipped with antennas 1152-a through 1152-n. In the system 1100, the base station 105-a may be able to send data over multiple communication links at the same time. Each communication link may be referred to as a "layer," and the "rank" of the communication link may indicate the number of layers used for communication. For example, in a 2×2 MIMO system where base station 105-a transmits two "layers," the rank of the communication link between the base station 105-a and the UE 115-c is two.

At the base station 105-a, a transmit (Tx) processor 1120 may receive data from a data source. The transmit processor 1120 may process the data. The transmit processor 1120 may also generate reference symbols and a cell-specific reference signal. A transmit (Tx) MIMO processor 1130 may perform spatial processing (e.g., precoding) on data symbols, control symbols, and/or reference symbols, if applicable, and may provide output symbol streams to the transmit modulators 1132-a through 1132-x. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-a through 1132-x may be transmitted via the antennas 1134-a through 1134-x, respectively.

At the UE 115-c, the UE antennas 1152-a through 1152-n may receive the DL signals from the base station 105-a and may provide the received signals to the demodulators 1154-a through 1154-n, respectively. The demodulators 1154-a through 1154-n may in some cases be exemplary components of the demodulator 430 described with reference to FIG. 4. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-a through 1154-n, perform MIMO detection on the received symbols if applicable, and provide detected symbols. A receive (Rx) processor 1158 may process (e.g., demodulate, deinterleave, and decode) the detected symbols, providing decoded data for the UE 115-c to a data output, and providing decoded control information to a processor 1180, or memory 1182. The Rx processor 1158 may include a timing identification module 305-c that may, in the event of an antenna switch amongst the antennas 1152-a through 1152-n, 1) identify a settling time associated with the antenna switch, and 2) determine a time trigger the antenna switch based at least in part on the identified settling time. The trigger time may be determined in a manner that mitigates data loss for the UE 115-c. In some cases, the timing identification module 305-c may be an example of one or more aspects of the timing identification module 305 described with reference to FIGS. 3, 4, and/or 5, or the timing identification module operations described with reference to FIGS. 7, 8, 9, and/or 10.

On the uplink (UL), at the UE 115-c, a transmit (Tx) processor 1164 may receive and process data from a data source. The transmit processor 1164 may also generate reference symbols for a reference signal. The symbols from the transmit processor 1164 may be precoded by a transmit (Tx) MIMO processor 1166 if applicable, further processed by the demodulators 1154-a through 1154-n (e.g., for SC-FDMA, etc.), and be transmitted to the base station 105-a in accordance with the transmission parameters received from the base station 105-a. At the base station 105-a, the UL signals from the UE 115-c may be received by the antennas 1134, processed by the demodulators 1132, detected by a MIMO detector 1136 if applicable, and further processed by a receive processor 1138. The receive (Rx) processor 1138 may provide decoded data to a data output and to the processor 1140. The processor 1140 may include a module or function 1141 that may control the operation of one or more of the modulators 1132-a through 1132-x and one or more of the antennas 1134-a through 1134-x in the event of a transmit diversity antenna switch. For example, the module or function 1141 may control transmit diversity antenna switching in the base station 105-*a*.

The components of the base station 105-*a* may, individually or collectively, be implemented with one or more Application Specific Integrated Circuits (ASICs) adapted to perform some or all of the applicable functions in hardware. Each of the noted modules may be a means for performing one or more functions related to operation of the system 1100. Similarly, the components of the UE 115-*c* may, individually or collectively, be implemented with one or more Application Specific Integrated Circuits (ASICs) adapted to perform some or all of the applicable functions in hardware. Each of the noted components may be a means for performing one or more functions related to operation of the system 1100.

Figure 12:
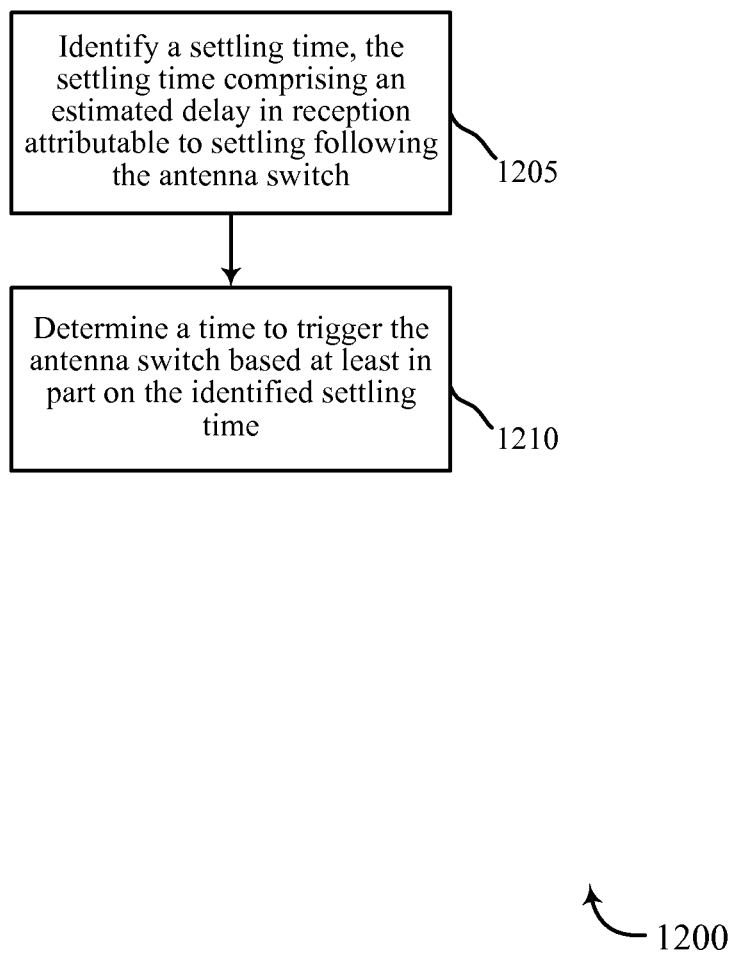
FIG. 12 is a flowchart of a method for triggering an antenna switch in accordance with various embodiments.

FIG. 12 is a flow chart illustrating an embodiment of a method 1200 for triggering an antenna switch. For clarity, the method 1200 is described below with reference to the wireless communications system 100 or 1100 shown in FIGS. 1 and/or 11, and/or with reference to one of the UEs 115 described with reference to FIGS. 1, 3, 4, and/or 11. In one implementation, the timing identification module 305 described with reference to FIGS. 3, 4, 5, 6, and/or 11 may execute one or more sets of codes to control the functional elements of a UE 115 to perform the functions described below.

At block 1205, a settling time may be identified. The settling time may include an estimated delay in reception attributable to settling following an antenna switch. In some embodiments, the operations at block 1205 may be performed by the settling time identification module 505 described with reference to FIGS. 5 and/or 6.

At block 1210, a time to trigger the antenna switch may be determined based at least in part on the identified settling time. In some embodiments, the operations at block 1210 may be performed by the trigger time determination module 520 described with reference to FIGS. 5 and/or 6.

Therefore, the method 1200 may be used for triggering an antenna switch. It should be noted that the method 1200 is just one implementation and that the operations of the method 1200 may be rearranged or otherwise modified such that other implementations are possible.

Figure 13:
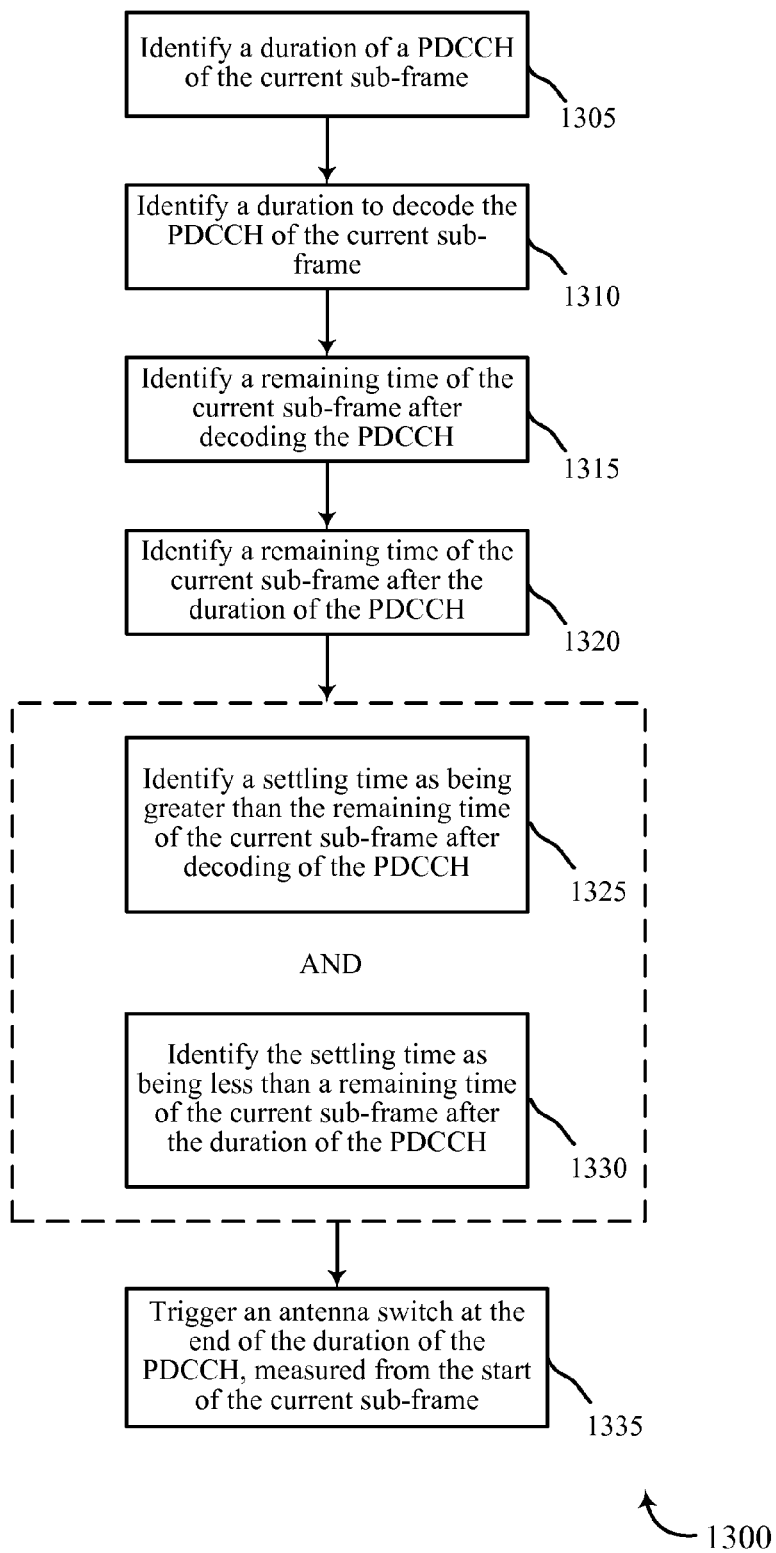
FIG. 13 is a flowchart of another method for triggering an antenna switch in accordance with various embodiments.

FIG. 13 is a flow chart illustrating an embodiment of a method 1300 for triggering an antenna switch. For clarity, the method 1300 is described below with reference to the wireless communications system 100 or 1100 shown in FIGS. 1 and/or 11, and/or with reference to one of the UEs 115 described with reference to FIGS. 1, 3, 4, and/or 11. In one implementation, the timing identification module 305 described with reference to FIGS. 3, 4, 5, 6, and/or 11 may execute one or more sets of codes to control the functional elements of a UE 115 to perform the functions described below.

At block 1305, a duration of a PDCCH of a current sub-frame being received by a UE 115 may be identified. The PDCCH duration may be the time it takes the UE 115 to receive the PDCCH portion of the current sub-frame. In some embodiments, the operations at block 1305 may be performed by the PDCCH duration identification sub-module 605 described with reference to FIG. 6.

At block 1310, a duration to decode the PDCCH of the current sub-frame may be identified. The PDCCH decode duration may be the time it takes the UE 115 to decode the PDCCH portion of the current sub-frame (e.g., the time it takes to decode the PDCCH portion with respect to the start of the current sub-frame). In some embodiments, the operations at block 1310 may be performed by the PDCCH decoding duration identification sub-module 610 described with reference to FIG. 6.

At block 1315, a remaining time of the current sub-frame after decoding the PDCCH may be identified, and at block 1320, a remaining time of the current sub-frame after the duration of the PDCCH may be identified. In some embodiments, the operations at blocks 1315 and 1320 may be performed by the sub-frame duration identification sub-module 615 described with reference to FIG. 6.

At block 1325, a settling time associated with an antenna switch may be identified as being greater than the remaining time of the current sub-frame after decoding of the PDCCH, and at block 1330, the settling time may be identified as being less than a remaining time of the current sub-frame after the duration of the PDCCH. In some embodiments, the operations at blocks 1325 and 1330 may be performed by the trigger time determination module 520 described with reference to FIGS. 5 and/or 6.

At block 1335, an antenna switch may be triggered at the end of the duration of the PDCCH, as measured from the start of the current sub-frame. In some embodiments, the operations at block 1335 may be performed by the trigger time determination module 520 described with reference to FIGS. 5 and/or 6.

Therefore, the method 1300 may be used for triggering an antenna switch. It should be noted that the method 1300 is just one implementation and that the operations of the method 1300 may be rearranged or otherwise modified such that other implementations are possible. The method 1300 may in some cases be performed in response to the timing and durations described with reference to FIG. 8.

Figure 14:
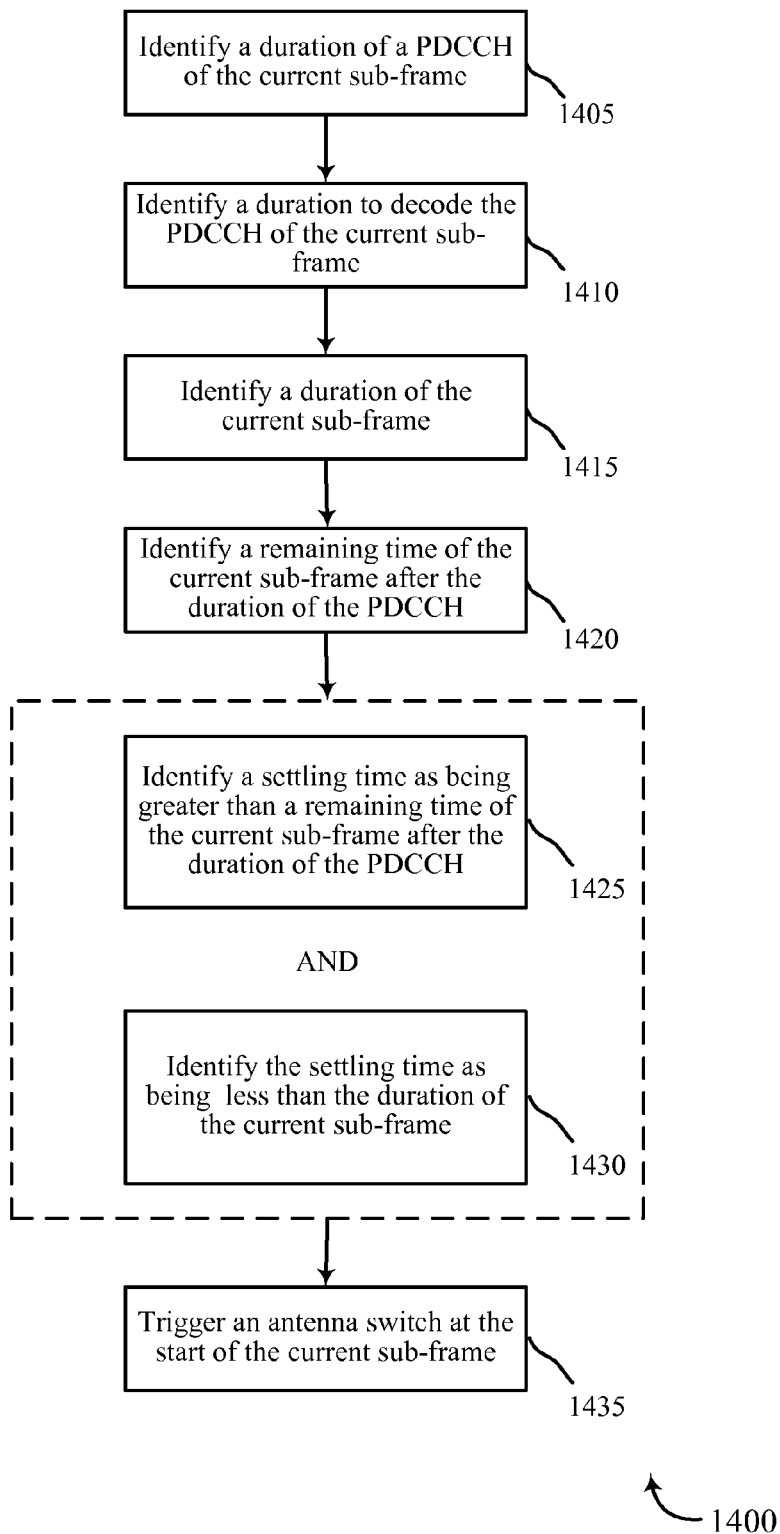
FIG. 14 is a flowchart of a yet another method for triggering an antenna switch in accordance with various embodiments.

FIG. 14 is a flow chart illustrating an embodiment of a method 1400 for triggering an antenna switch. For clarity, the method 1400 is described below with reference to the wireless communications system 100 or 1100 shown in FIGS. 1 and/or 11, and/or with reference to one of the UEs 115 described with reference to FIGS. 1, 3, 4, and/or 11. In one implementation, the timing identification module 305 described with reference to FIGS. 3, 4, 5, 6, and/or 11 may execute one or more sets of codes to control the functional elements of a UE 115 to perform the functions described below.

At block 1405, a duration of a PDCCH of a current sub-frame being received by a UE 115 may be identified. The PDCCH duration may be the time it takes the UE 115 to receive the PDCCH portion of the current sub-frame. In some embodiments, the operations at block 1405 may be performed by the PDCCH duration identification sub-module 605 described with reference to FIG. 6.

At block 1410, a duration to decode the PDCCH of the current sub-frame may be identified. The PDCCH decode duration may be the time it takes the UE 115 to decode the PDCCH portion of the current sub-frame (e.g., the time it takes to decode the PDCCH portion with respect to the start of the current sub-frame). In some embodiments, the operations at block 1410 may be performed by the PDCCH decoding duration identification sub-module 610 described with reference to FIG. 6.

At block 1415, a duration of the current sub-frame may be identified, and at block 1420, a remaining time of the current sub-frame after the duration of the PDCCH may be identified. In some embodiments, the operations at blocks 1415 and 1420 may be performed by the sub-frame duration identification sub-module 615 described with reference to FIG. 6.

At block 1425, a settling time associated with an antenna switch may be identified as being greater than the remaining time of the current sub-frame after the duration of the PDCCH, and at block 1430, the settling time may be identified as being less than the duration of the current sub-frame. In some embodiments, the operations at blocks 1425 and 1430 may be performed by the trigger time determination module 520 described with reference to FIGS. 5 and/or 6.

At block 1435, an antenna switch may be triggered at the start of the current sub-frame. In some embodiments, the operations at block 1435 may be performed by the trigger time determination module 520 described with reference to FIGS. 5 and/or 6.

Therefore, the method 1400 may be used for triggering an antenna switch. It should be noted that the method 1400 is just one implementation and that the operations of the method 1400 may be rearranged or otherwise modified such that other implementations are possible. The method 1400 may in some cases be performed in response to the timing and durations described with reference to FIG. 9.

Figure 15:
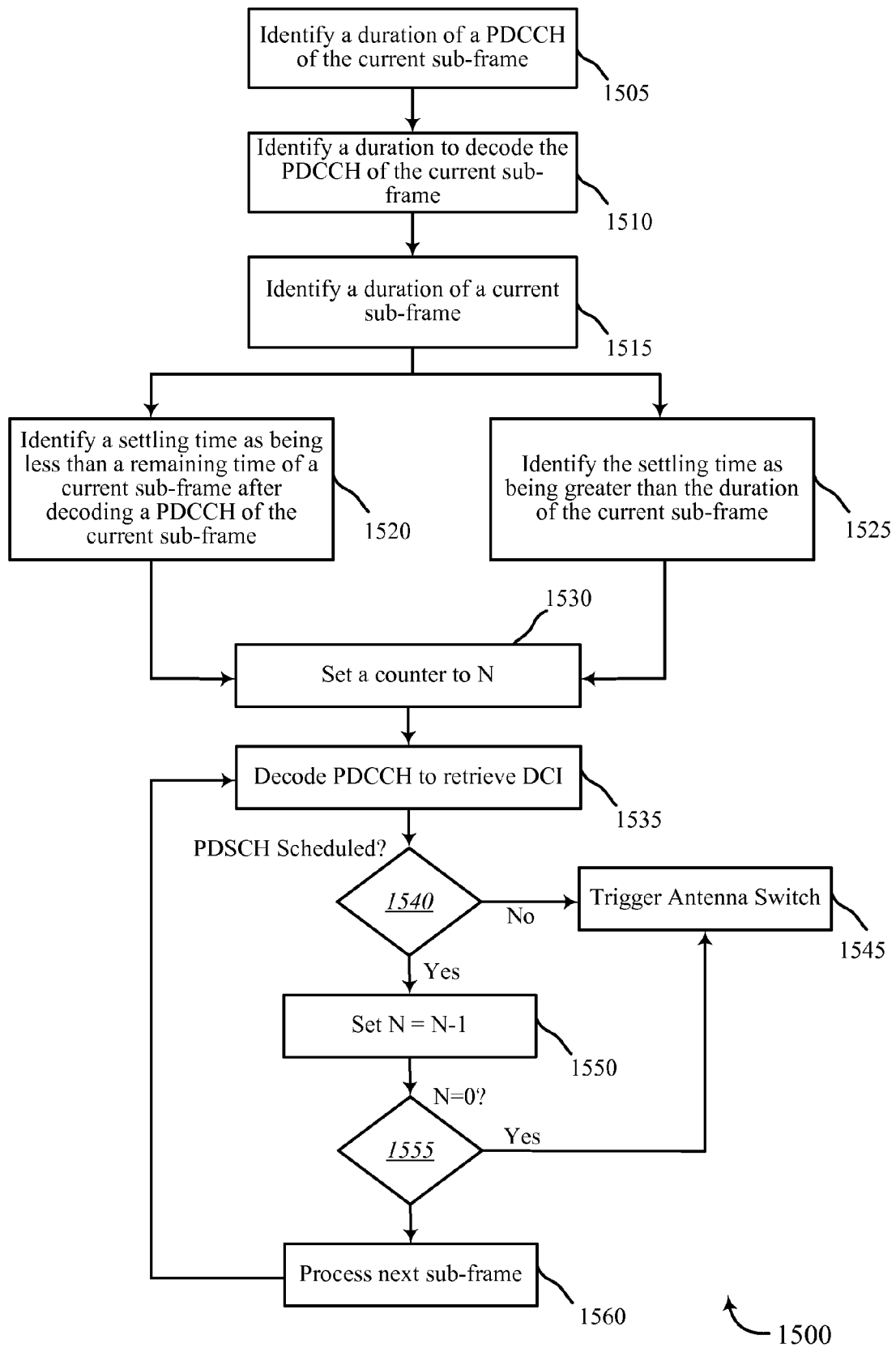
FIG. 15 is a flowchart of another method for triggering an antenna switch in accordance with various embodiments.

FIG. 15 is a flow chart illustrating an embodiment of a method 1500 for triggering an antenna switch. For clarity, the method 1500 is described below with reference to the wireless communications system 100 or 1100 shown in FIGS. 1 and/or 11, and/or with reference to one of the UEs 115 described with reference to FIGS. 1, 3, 4, and/or 11. In one implementation, the timing identification module 305 described with reference to FIGS. 3, 4, 5, 6, and/or 11 may execute one or more sets of codes to control the functional elements of a UE 115 to perform the functions described below.

At block 1505, a duration of a PDCCH of a current sub-frame being received by a UE 115 may be identified. The PDCCH duration may be the time it takes the UE 115 to receive the PDCCH portion of the current sub-frame. In some embodiments, the operations at block 1505 may be performed by the PDCCH duration identification sub-module 605 described with reference to FIG. 6.

At block 1510, a duration to decode the PDCCH of the current sub-frame may be identified. The PDCCH decode duration may be the time it takes the UE 115 to decode the PDCCH portion of the current sub-frame (e.g., the time it takes to decode the PDCCH portion with respect to the start of the current sub-frame). In some embodiments, the operations at block 1510 may be performed by the PDCCH decoding duration identification sub-module 610 described with reference to FIG. 6.

At block 1515, a duration of the current sub-frame may be identified. In some embodiments, the operations at blocks 1515 and 1520 may be performed by the sub-frame duration identification sub-module 615 described with reference to FIG. 6.

At block 1520, a settling time associated with an antenna switch may be identified as being less than a remaining time of the current sub-frame after decoding the PDCCH of the current sub-frame. Alternately, at block 1525, the settling time may be identified as being greater than the duration of the current sub-frame. In some embodiments, the operations at blocks 1520 and 1525 may be performed by the trigger time determination module 520 described with reference to FIGS. 5 and/or 6.

At block 1530, a counter may be set to some number of sub-frames N. A loop may then be entered. At block 1535, the PDCCH of the current sub-frame N may be decoded to retrieve its DCI and determine whether PDSCH is scheduled in the current sub-frame. Upon determining that PDSCH is absent, at block 1540, an antenna switch may be triggered in the current sub-frame N at block 1545. The antenna switch may be timed to follow the decode of the PDSCH. However, upon determining at block 1540 that PDSCH is scheduled in the current sub-frame, N may be set to N minus 1 (e.g., N=N−1) at block 1550. It may then be determined if N equals zero (e.g., N=0) at block 1555. If yes, an antenna switch may be triggered in the current sub-frame N at block 1545. Otherwise, the next sub-frame may be processed at block 1560, and flow of the method 1500 may return to block 1535. In some embodiments, the operations at blocks 1535-1560 may be performed by the trigger time determination module 520 described with reference to FIGS. 5 and/or 6.

Therefore, the method 1500 may be used for triggering an antenna switch. It should be noted that the method 1500 is just one implementation and that the operations of the method 1500 may be rearranged or otherwise modified such that other implementations are possible. The method 1500 may in some cases be performed in response to the timing and durations described with reference to FIGS. 7 and/or 10.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for triggering an antenna switch, comprising:
    identifying a settling time, the settling time comprising an estimated delay in reception attributable to settling following the antenna switch;
    determining a delay for the antenna switch that results in a fewest number of durations of a Physical Downlink Control Channel (PDCCH) overlapping with the identified settling time;
    delaying the antenna switch based at least in part on the determined delay; and
    decoding a PDCCH of a current sub-frame or a PDCCH of a following sub-frame based at least in part on delaying the antenna switch.

2. The method of claim 1, wherein the identified settling time is less than a remaining time of the current sub-frame after decoding the PDCCH of the current sub-frame.

3. The method of claim 2, wherein decoding the PDCCH of the current sub-frame or the PDCCH of the following sub-frame comprises retrieving downlink control information (DCI), the method further comprising:
    determining whether a Physical Downlink Shared Channel (PDSCH) is scheduled in the current sub-frame based at least in part on the retrieved DCI.

4. The method of claim 3, further comprising:
    upon determining that the PDSCH is scheduled in the current sub-frame, delaying the antenna switch until one or more sub-frames following the current sub-frame.

5. The method of claim 3, further comprising:
    upon determining that the PDSCH is absent in the current sub-frame, switching the antenna during the current sub-frame.

6. The method of claim 1, wherein the identified settling time is greater than a remaining time of the current sub-frame after decoding the PDCCH of the current sub-frame.

7. The method of claim 6, further comprising:
identifying a duration of the PDCCH of the current sub-frame; and
switching the antenna following the identified duration of the PDCCH of the current sub-frame.

8. The method of claim 1, wherein the identified settling time is greater than a duration of the current sub-frame.

9. The method of claim 8, wherein decoding the PDCCH of the current sub-frame or the PDCCH of the following sub-frame comprises retrieving downlink control information (DCI), the method further comprising:
determining whether a Physical Downlink Shared Channel (PDSCH) is scheduled in the current sub-frame based at least in part on the retrieved DCI.

10. The method of claim 9, further comprising:
upon determining that the PDSCH is scheduled in the current sub-frame, delaying the antenna switch until one or more sub-frames following the current sub-frame.

11. The method of claim 9, further comprising:
upon determining that the PDSCH is absent in the current sub-frame, switching the antenna during the current sub-frame.

12. The method of claim 1, wherein the settling time comprises:
a time for a hardware switch to settle; or
a time for one or more receiver loops to settle on channel conditions following the antenna switch.

13. An apparatus for triggering an antenna switch, comprising:
a processor;
memory in electronic communication with the processor; and
instructions stored in the memory, the instructions being executable by the processor to:
identify a settling time, the settling time comprising an estimated delay in reception attributable to settling following the antenna switch;
determine a delay for the antenna switch that results in a fewest number of durations of a Physical Downlink Control Channel (PDCCH) overlapping with the identified settling time;
delay the antenna switch based at least in part on the determined delay; and
decode a PDCCH of a current sub-frame or a PDCCH of a following sub-frame based at least in part on delaying the antenna switch.

14. The apparatus of claim 13, wherein the identified settling time is less than a remaining time of the current sub-frame after decoding the PDCCH of the current sub-frame.

15. The apparatus of claim 14, wherein decoding the PDCCH of the current sub-frame or the PDCCH of the following sub-frame comprises retrieving downlink control information (DCI), the instructions further executable by the processor to:
determine whether a Physical Downlink Shared Channel (PDSCH) is scheduled in the current sub-frame based at least in part on the retrieved DCI.

16. The apparatus of claim 15, wherein the instructions are further executable by the processor to:
upon determining that the PDSCH is scheduled in the current sub-frame, delay the antenna switch until one or more sub-frames following the current sub-frame.

17. The apparatus of claim 15, wherein the instructions are further executable by the processor to:
upon determining that the PDSCH is absent in the current sub-frame, switch the antenna during the current sub-frame.

18. The apparatus of claim 13, wherein the identified settling time is greater than a remaining time of the current sub-frame after decoding the PDCCH of the current sub-frame.

19. The apparatus of claim 18, wherein the instructions are further executable by the processor to:
identify a duration of the PDCCH of the current sub-frame; and
switch the antenna following the identified duration of the PDCCH.

20. The apparatus of claim 13, further comprising:
at least one switch operably connected to the processor;
at least one antenna operably connected to the at least one switch;
at least one receive chain operably connected to the at least one switch; and
at least one transmit chain operably connected to the at least one switch.

21. The apparatus of claim 13, wherein the identified settling time is greater than a duration of the current sub-frame.

22. The apparatus of claim 21, wherein decoding the PDCCH of the current sub-frame or the PDCCH of the following sub-frame comprises retrieving downlink control information (DCI), the instructions further executable by the processor to:
determine whether a Physical Downlink Shared Channel (PDSCH) is scheduled in the current sub-frame based at least in part on the retrieved DCI.

23. The apparatus of claim 22, wherein the instructions are further executable by the processor to:
upon determining that the PDSCH is scheduled in the current sub-frame, delay the antenna switch until one or more sub-frames following the current sub-frame.

24. The apparatus of claim 22, wherein the instructions are further executable by the processor to:
upon determining that the PDSCH is absent in the current sub-frame, switching the antenna during the current sub-frame.

25. The apparatus of claim 13, wherein the settling time comprises:
a time for a hardware switch to settle; or
a time for one or more receiver loops to settle on channel conditions following the antenna switch.

26. An apparatus for triggering an antenna switch, comprising:
means for identifying a settling time, the settling time comprising an estimated delay in reception attributable to settling following the antenna switch;
means for determining a delay for the antenna switch that results in a fewest number of durations of a Physical Downlink Control Channel (PDCCH) overlapping with the identified settling time;
means for delaying the antenna switch based at least in part on the determined delay; and
means for decoding a PDCCH of a current sub-frame or a PDCCH of a following sub-frame based at least in part on delaying the antenna switch.

27. A computer program product for triggering an antenna switch, the computer program product comprising a non-transitory computer-readable medium storing instructions executable by a processor to:

identify a settling time, the settling time comprising an estimated delay in reception attributable to settling following the antenna switch;
determine a delay for the antenna switch that results in a fewest number of durations of a Physical Downlink Control Channel (PDCCH) overlapping with the identified settling time;
delay the antenna switch based at least in part on the determined delay; and
decode a PDCCH of a current sub-frame or a PDCCH of a following sub-frame based at least in part on delaying the antenna switch.

* * * * *